US011500176B2

(12) United States Patent
Kim

(10) Patent No.: US 11,500,176 B2
(45) Date of Patent: Nov. 15, 2022

(54) LENS ASSEMBLY AND ELECTRONIC DEVICE INCLUDING THE SAME

(71) Applicant: Samsung Electronics Co., Ltd., Gyeonggi-do (KR)

(72) Inventor: Hyunjea Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 16/749,003

(22) Filed: Jan. 22, 2020

(65) Prior Publication Data

US 2020/0241250 A1 Jul. 30, 2020

(30) Foreign Application Priority Data

Jan. 25, 2019 (KR) ........................ 10-2019-0009676

(51) Int. Cl.
*G02B 9/60* (2006.01)
*G02B 13/00* (2006.01)
*H04N 5/232* (2006.01)

(52) U.S. Cl.
CPC ........... *G02B 9/60* (2013.01); *G02B 13/0045* (2013.01); *H04N 5/23212* (2013.01)

(58) Field of Classification Search
None
See application file for complete search history.

(56) References Cited

U.S. PATENT DOCUMENTS

| 2011/0149415 | A1 | 6/2011 | Jeong |
| 2012/0092778 | A1 | 4/2012 | Tsai et al. |
| 2013/0182335 | A1 | 7/2013 | Tsai et al. |
| 2015/0085386 | A1* | 3/2015 | Tanaka ............... G02B 13/0045 359/764 |
| 2015/0103415 | A1 | 4/2015 | Chen et al. |
| 2015/0185446 | A1 | 7/2015 | Hsu et al. |

(Continued)

FOREIGN PATENT DOCUMENTS

| CN | 106970452 A | 7/2017 |
| JP | 2018-097338 A | 6/2018 |

(Continued)

OTHER PUBLICATIONS

European Search Report dated Nov. 29, 2021.
International Search Report dated May 7, 2020.

*Primary Examiner* — Darryl J Collins
(74) *Attorney, Agent, or Firm* — Cha & Reiter, LLC

(57) ABSTRACT

A lens assembly may include: a first lens having positive refractive power and including a convex subject side surface; a second lens; a third lens having negative refractive power and including a subject side surface being convex toward an image secsor side in a center portion thereof, through which an optical axis passes; a fourth lens having positive or negative refractive power; and a fifth lens having positive or negative refractive power. The first lens, the second lens, the third lens, the fourth lens, and the fifth lens may be sequentially arranged from a subject to an image sensor along the optical axis. The lens assembly may satisfy a condition defined by 0.6<TTL/ImgH<1, where "TTL" represents a distance from the subject side surface of the first lens to an imaging surface of the image sensor, and "ImgH" represents a maximum image height of an image formed on the imaging surface.

19 Claims, 16 Drawing Sheets

(56) References Cited

U.S. PATENT DOCUMENTS

| | | |
|---|---|---|
| 2016/0091691 A1 | 3/2016 | Son |
| 2016/0116705 A1 | 4/2016 | Lee et al. |
| 2016/0139368 A1 | 5/2016 | You |
| 2016/0139370 A1* | 5/2016 | Lee .................... G02B 13/0045 359/764 |
| 2016/0154211 A1 | 6/2016 | Jo |
| 2016/0161714 A1 | 6/2016 | Lee et al. |
| 2016/0259147 A1* | 9/2016 | Hsueh ................ G02B 13/0045 |
| 2016/0299320 A1 | 10/2016 | Huang |
| 2016/0349489 A1* | 12/2016 | Dai .................... G02B 13/0045 |
| 2018/0011300 A1 | 1/2018 | Chen et al. |
| 2018/0113281 A1* | 4/2018 | Tsai ....................... G02B 5/208 |
| 2018/0164547 A1 | 6/2018 | Fang |
| 2018/0335612 A1 | 11/2018 | Chen |
| 2019/0025548 A1* | 1/2019 | Yang .................. G02B 27/0025 |

FOREIGN PATENT DOCUMENTS

| | | |
|---|---|---|
| KR | 10-2016-0038267 A | 4/2016 |
| KR | 10-2016-0049871 A | 5/2016 |
| KR | 10-2016-0058593 A | 5/2016 |
| KR | 10-2016-0069389 A | 6/2016 |

\* cited by examiner

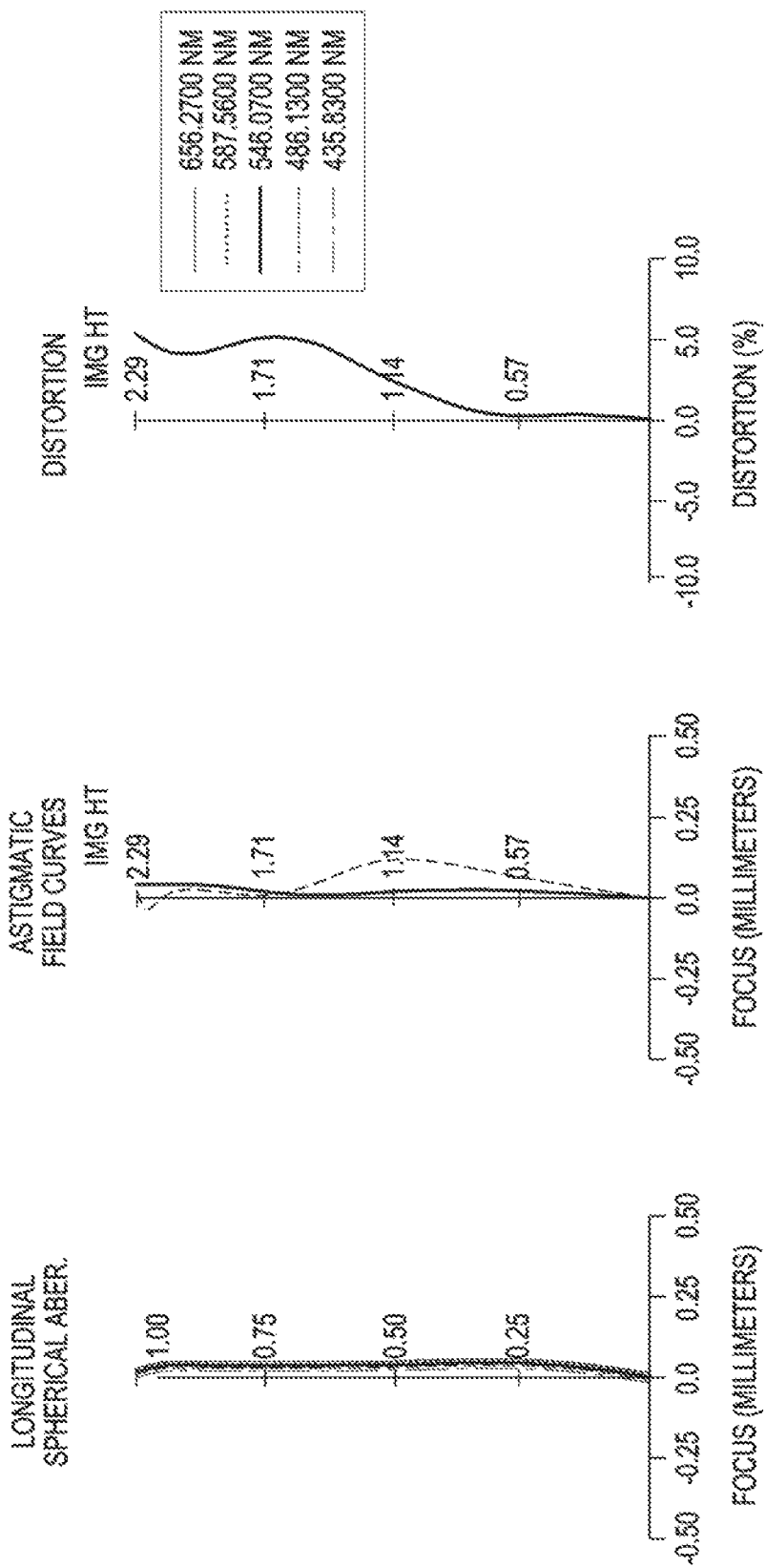

LENS ASSEMBLY AND ELECTRONIC DEVICE INCLUDING THE SAME

CROSS-REFERENCE TO RELATED APPLICATION(S)

This application is based on and claims priority under 35 U.S.C. 119 from Korean Patent Application No. 10-2019-0009676, filed on Jan. 25, 2019, in the Korean Intellectual Property Office, the disclosure of which is herein incorporated by reference in its entirety.

BACKGROUND

1. Technical Field

One or more embodiments disclosed herein generally relate to an optical device. For example, certain embodiments may relate to a lens assembly including a plurality of lenses and an electronic device including the lens assembly.

2. Description of Related Art

Optical devices (e.g., cameras capable of capturing image or video) are widely used. Recently, digital cameras or video cameras having a solid image sensor (e.g., charge-coupled device (CCD) or complementary metal-oxide semiconductor (CMOS)) have been widely distributed. Optical devices with solid image sensors are replacing film-type optical devices due to easy image storage and reproduction as well as being more portable compared to the film-type optical devices.

In recent technological developments, a plurality of optical devices may be mounted together in a single electronic device in order to improve the quality of captured images and to provide various visual effects to the captured images. For example, images of a subject may be acquired via a plurality of cameras having different optical characteristics (e.g., a telephoto camera and a wide-angle camera), and the images may be synthesized in order to acquire a captured image. Such optical devices may be mounted on an electronic device specialized for image-capturing function, such as a digital camera. Recently, such optical devices are increasingly mounted in miniaturized portable electronic devices, such as mobile communication terminals.

SUMMARY

As the use of electronic devices such as mobile communication terminals has become popular, users have increasingly desired improved appearances for the electronic devices. For example, electronic devices are becoming thinner, display sizes are increasing, and bezels are being designed to meet market demand. However, in general, optical devices (e.g., a camera) mounted in the mobile communication terminals may not completely satisfy the market demand since the total length (TTL) of the lenses thereof is long, the flange back length (FBL) of the lenses is short, and the sizes of the lenses are large.

According to an embodiment, a lens assembly may include: a first lens having positive refractive power and including a subject side surface being convex; a second lens having positive or negative refractive power; a third lens having negative refractive power and including an image sensor side surface being convex in a center portion thereof, through which an optical axis passes; a fourth lens having positive or negative refractive power; and a fifth lens having positive or negative refractive power. The first lens, the second lens, the third lens, the fourth lens, and the fifth lens may be sequentially arranged from a subject to an image sensor along the optical axis. The lens assembly may satisfy Conditional Expression 1 as follows.

$$0.6 < TTL/ImgH < 1 \qquad \text{Conditional Expression 1}$$

Here, "TTL" represents the distance from the subject side surface of the first lens to an imaging surface of the image sensor, and "ImgH" represents a maximum image height of an image formed on the imaging surface.

According to an embodiment, an electronic device may include at least one camera including a lens assembly configured to acquire information on a subject from light incident through the lens assembly and a processor or an image signal processor configured to detect distance information of the subject based on the information. The lens assembly may include at least a first lens, a second lens, a third lens, a fourth lens, and a fifth lens sequentially arranged along an optical axis from the subject to an image sensor, the third lens may have negative refractive power, and the image sensor may have a size between 1/10.1 inches and 1/3.1 inches.

The lens assembly may satisfy Conditional Expression 10 as follows.

$$0.6 < TTL/ImgH < 1 \qquad \text{Conditional Expression 10}$$

Here, "TTL" represents the distance from a subject side surface of the first lens to an imaging surface of the image sensor, and "ImgH" represents a maximum image height of an image formed on the imaging surface.

According to an embodiment, a lens assembly may include: a first lens having positive refractive power and including a subject side surface being convex; a second lens having negative refractive power; a third lens having negative refractive power and including an image sensor side surface being convex in a center portion thereof, through which an optical axis passes; a fourth lens having negative refractive power; and a fifth lens having positive refractive power. The first lens, the second lens, the third lens, the fourth lens, and the fifth lens may be sequentially arranged from the subject to an image sensor along the optical axis. The lens assembly may satisfy Conditional Expression 14 and Conditional Expression 15 as follows.

$$0.6 < TTL/ImgH < 1 \qquad \text{Conditional Expression 14}$$

Here, "TTL" represents the distance from the subject side surface of the first lens to an imaging surface of the image sensor, and "ImgH" represents a maximum image height of an image formed on the imaging surface.

$$0.25 < BFL/TTL < 0.6 \qquad \text{Conditional Expression 15}$$

Here, "BFL" represents a distance from a center of an image sensor side surface of the fifth lens to the imaging surface of the image sensor.

BRIEF DESCRIPTION OF THE DRAWINGS

The above and other aspects, features, and advantages of the disclosure will be more apparent from the following detailed description taken in conjunction with the accompanying drawings, in which:

FIG. 16A is a graph representing the spherical aberration of the lens assembly of FIG. 15, FIG. 16B is a graph representing the astigmatism of the lens assembly of FIG. 15, and FIG. 16C is a graph illustrating the distortion rate of the lens assembly of FIG. 15.

DETAILED DESCRIPTION

Certain embodiments disclosed herein provide a lens assembly for implementing an optical device equipped with lenses having a small-diameter barrel by increasing a flange back length (FBL) relative to a total length (TTL) of the lenses, and/or an electronic device including the lens assembly.

According to one or more embodiments, it is possible to provide a lens assembly that can be easily mounted in a miniaturized electronic device, and/or an electronic device including the lens assembly.

According to an embodiment, the barrels of the lenses constituting the lens assembly may be implemented to have a small diameter, so that it is possible to minimize the size of a camera hole exposed and thus forms part of the external appearance of the electronic device. Accordingly, it is possible to implement an aesthetically pleasing electronic device.

According to an embodiment, it is possible to implement a lens assembly for implementing an optical device that can be easily mounted in a miniaturized electronic device while using five lenses by increasing the ratio of the flange back length (FBL) to the total length (TTL) of the lenses, and/or an electronic device including the lens assembly.

According to an embodiment, it is possible to implement a miniaturized lens assembly, which is combined with an image sensor of 1/3.1 inches or less and in which lenses are easy to manufacture or combine, and an electronic device including the lens assembly.

Figure 1:
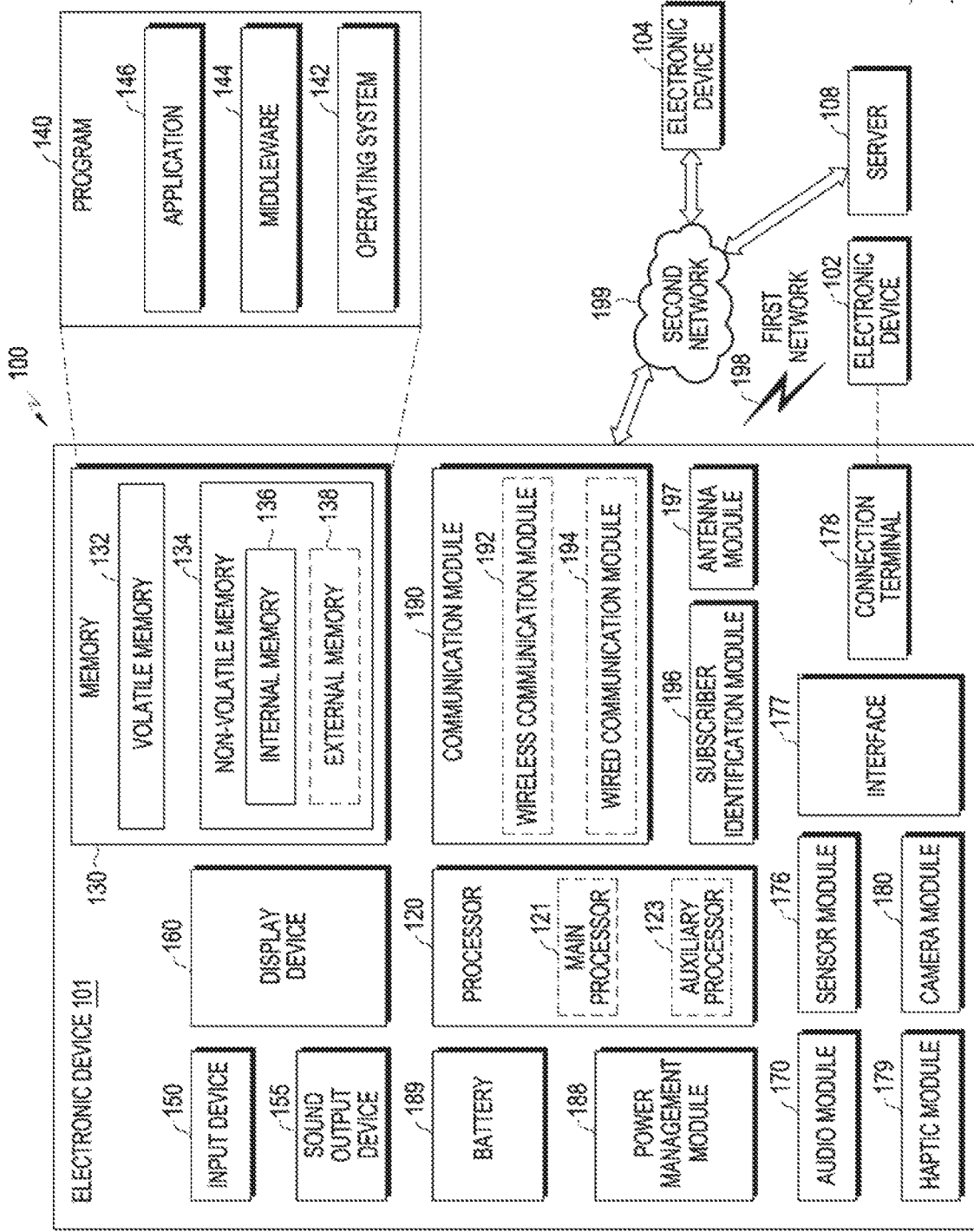
FIG. 1 is a block diagram of an electronic device according to various embodiments in a network environment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
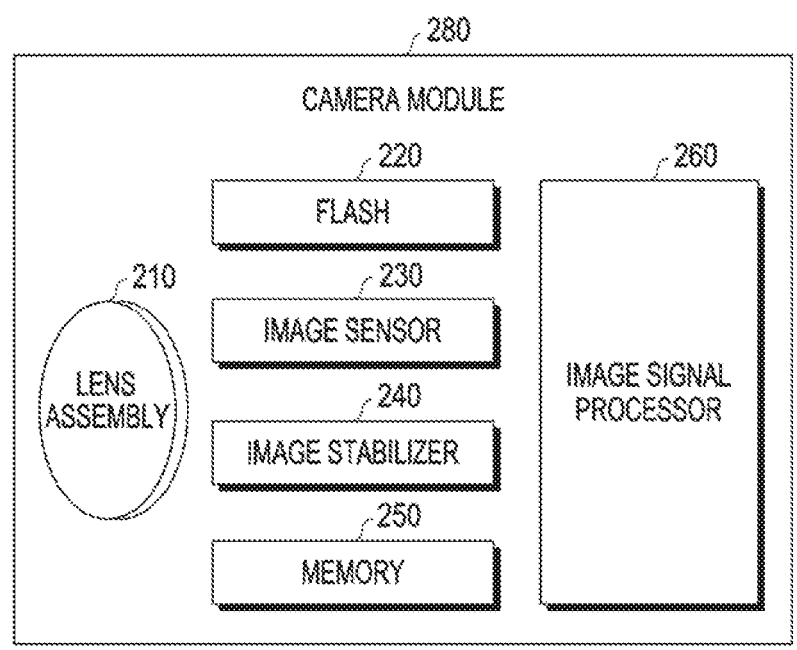
FIG. 2 is a block diagram illustrating a camera module according to an embodiment.

FIG. 2 is a block diagram 200 illustrating a camera module 280 according to an embodiment.

Referring to FIG. 2, the camera module 280 may include a lens assembly 210, a flash 220, an image sensor 230, an image stabilizer 240, memory 250 (e.g., buffer memory), or an image signal processor 260.

The lens assembly 210 may collect light emitted from a subject that is a target of image capturing. The lens assembly 210 may include one or more lenses. According to an embodiment, the camera module 280 may include a plurality of lens assemblies 210. In this case, the camera module 280 may form, for example, a dual camera, a 360-degree camera, or a spherical camera. Some of the plurality of lens assemblies 210 may have the same lens properties (e.g., angle of view, focal length, auto focus, f-number, or optical zoom), or at least one of the lens assemblies may have one or more lens properties different from the lens properties of the other lenses. Each lens assembly 210 may include, for example, a wide-angle lens or a telephoto lens.

The flash 220 may emit light used to enhance the light emitted or reflected from a subject. According to an embodiment, the flash 220 may include one or more light-emitting diodes (e.g., red-green-blue (RGB) LEDs, white LEDs, infrared LEDs, or ultraviolet LEDs), or a xenon lamp. The image sensor 230 may acquire an image corresponding to the subject by converting light emitted or reflected from the subject and transmitted through the lens assembly 210 into an electrical signal. According to an embodiment, the image sensor 230 may include one image sensor selected from image sensors having different properties, such as an RGB sensor, a black and white (BW) sensor, an IR sensor, or a UV sensor, a plurality of image sensors having the same properties, or a plurality images having different properties. Each image sensor included in the image sensor 230 may be implemented using, for example, a charge-coupled device (CCD) sensor or a complementary metal oxide semiconductor (CMOS) sensor.

The image stabilizer 240 may move at least one lens included in the lens assembly 210 or the image sensor 230 in a specific direction, or may control the operating characteristics of the image sensor 230 (e.g., adjustment of read-out timing) in response to the movement of the camera module 280 or the electronic device 201 including the camera module 280. This compensates for at least some of the negative effects of the movement on an image to be captured. According to an embodiment, the image stabilizer 240 may detect the movement of the camera module 280 or the electronic device (e.g., the electronic device 101 in FIG. 1) using a gyro sensor (not illustrated) or an acceleration sensor (not illustrated) disposed inside or outside the camera module 280. According to an embodiment, the image stabilizer 240 may be implemented as, for example, an optical image stabilizer.

The memory 250 may at least temporarily store at least some of the images acquired through the image sensor 230 for the next image processing task. For example, when image acquisition is delayed or a plurality of images are acquired at high speed depending on a shutter speed, the acquired original images (e.g., Bayer-patterned images or high-resolution images) are stored in the memory 250, and the copy images corresponding thereto (e.g., low-resolution images) may be previewed using the display device 160 of FIG. 1. Then, when a predetermined condition (e.g., a user input or a system command) is satisfied, at least some of the original images that have been stored in the memory 250 may be acquired and processed by, for example, the image signal processor 260. According to an embodiment, the memory 250 may be configured as at least a part of memory (e.g., the memory 130 in FIG. 1) or separate memory operated independently from the memory.

The image signal processor 260 may perform one or more kinds of image processing on the images acquired using the image sensor 230 or the images stored in the memory 250. The one or more kinds of image processing may include, for example, depth map generation, 3D modeling, panorama generation, feature point extraction, image synthesis, or image compensation (e.g., noise reduction, resolution adjustment, brightness adjustment, blurring, sharpening, or softening). Additionally or alternatively, the image signal processor 260 may perform control (e.g., exposure time control, or read-out timing control) of at least one of the components (e.g., the image sensor 230) included in the camera module 280. Images processed by the image signal processor 260 may be stored back in the memory 250 for further processing or may be provided to components outside the camera module 280 (e.g., the memory 130, the display device 160, the electronic device 102, the electronic device 104, or the server 108 in FIG. 1). According to an embodiment, the image signal processor 260 may be configured as at least a part of a processor (e.g., the processor 120 in FIG. 1) or may be configured as a separate processor operating independently of the processor 120. When the image signal processor 260 is configured as a processor separate from the processor 120, the processor may cause at least one image, which is processed by the image signal processor 260, to be displayed through the display device 160 as it is or after further image processing.

According to an embodiment, the electronic device (e.g., the electronic device 101 of FIG. 1) may include a plurality of camera modules 280 having different properties or functions. In this case, for example, at least one of the plurality of camera modules 280 may be a wide-angle camera, and at least another may be a telephoto camera. Similarly, for example, at least one of the plurality of camera modules 280 may be a front camera, and at least another may be a rear camera.

Figure 3:
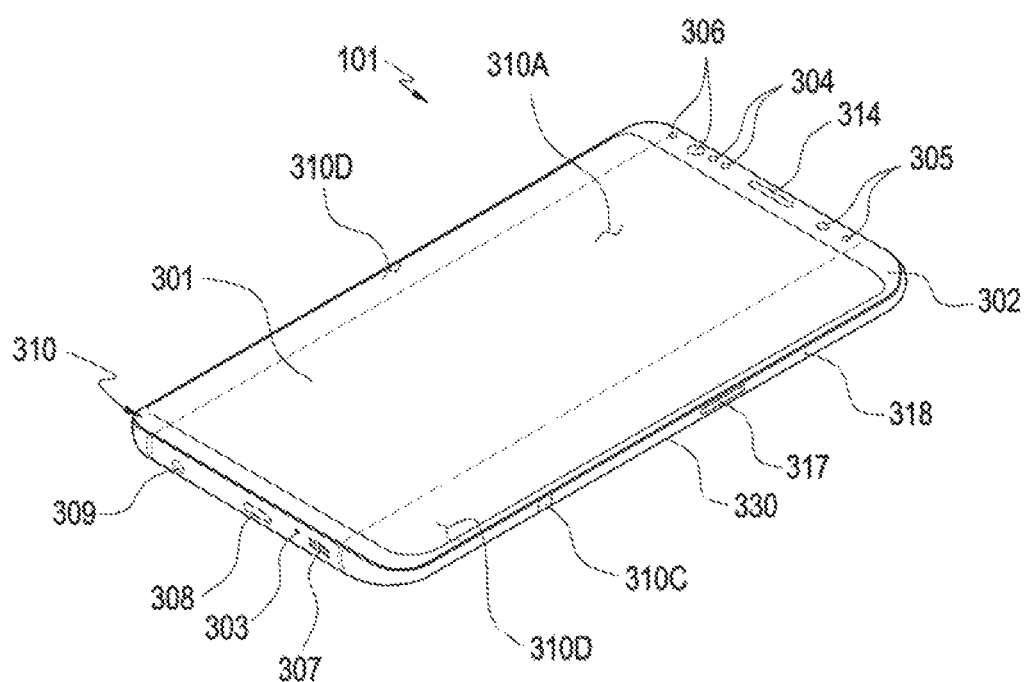
FIG. 3 is a perspective view illustrating the front face of an electronic device according to an embodiment.
Figure 4:
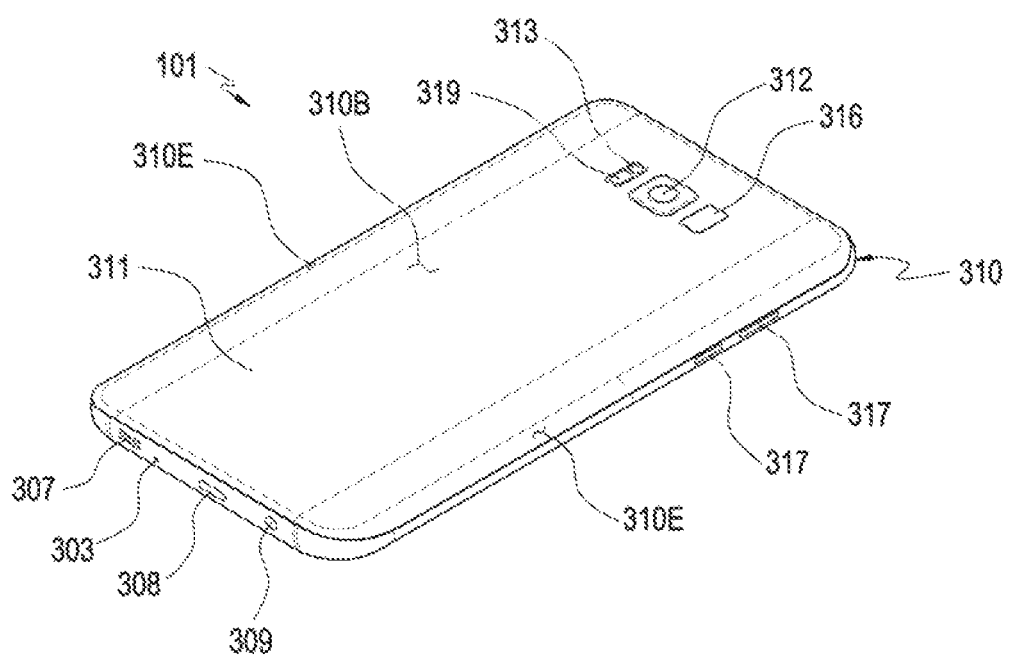
FIG. 4 is a perspective view illustrating the rear face of the electronic device illustrated FIG. 3.

FIG. 3 is a perspective view illustrating the front face of an electronic device 101 (e.g., the electronic device 101 in FIG. 1) according to an embodiment. FIG. 4 is a perspective view illustrating the rear face of the electronic device 101 illustrated FIG. 3.

Referring to FIGS. 3 and 4, the electronic device 101 (e.g., the electronic device 101 in FIG. 1) according to an embodiment may include a housing 310 including a first face (or a front face) 310A, a second face (or a rear face)

310B, and a side face 310C surrounding the space between the first face 310A and the second face 310B. In another embodiment (not illustrated), the term "housing 310" may refer to a structure forming a part of the first face 310A, the second face 310B, and the side face 310C of FIG. 3. According to an embodiment, at least a portion of the first face 310A may be formed of a substantially transparent front plate 302 (e.g., a glass plate or a polymer plate including various coating layers). In another embodiment, the front plate 302 is coupled to the housing 310 to form an inner space with the housing 310. Here, the "inner space" may mean the space between the front plate 302 and a first support member (e.g., the rear plate 311 of FIG. 4) to be described later. In various embodiments, the term "inner space" may mean the inner space of the housing, which accommodates at least a part of a display 301 to be described later or the display device 160 in FIG. 1.

According to various embodiments, the second face 310B may be formed by a substantially opaque rear plate 311. The rear plate 311 may be formed of, for example, coated or colored glass, ceramic, polymer, or metal (e.g., aluminum, stainless steel (STS), or magnesium), or a combination of two or more of these materials. The side face 310C may be formed by a side bezel structure 318 (or a "side member") coupled to the front plate 302 and the rear plate 311 and including metal and/or polymer. In various embodiments, the rear plate 311 and the side bezel structure 318 may be integrally formed, and may include the same material (e.g., a metal material such as aluminum).

In the illustrated embodiment, the front plate 302 may include, at the long opposite side edges thereof, two first areas 310D, which are bent from the first face 310A towards the rear plate 311 and extend seamlessly. In the illustrated embodiment (see FIG. 3), the rear plate 311 may include, at the long opposite side edges thereof, two second areas 310E, which are bent from the second face 310B towards the front plate 302 and extend seamlessly. In various embodiments, the front plate 302 (or the rear plate 311) may include only one of the first areas 310D (or the second areas 310E). In another embodiment, some of the first areas 310D and the second areas 310E may not be included. In the above embodiments, when viewed from a side of the electronic device 101, the side bezel structure 318 may have a first thickness (or width) on the side face in which the first areas 310D or the second areas 310E are not included (e.g., the side face in which the connector hole 308 is formed), and may have a second thickness, which is smaller than the first thickness, on the side face in which the first areas 310D or the second areas 310E are included (e.g., the side face in which the key input device 317 is disposed).

According to an embodiment, the electronic device 101 may include at least one of a display 301, audio modules 303, 307, and 314, sensor modules 304, 316, and 319, camera modules 305, 312, and 313, key input devices 317, light-emitting elements 306, and connector holes 308 and 309. In various embodiments, at least one of the components (e.g., the key input devices 317 or the light-emitting elements 306) may be omitted from the electronic device 101, or the electronic device 101 may additionally include other components.

The display 301 (e.g., the display device 160 in FIG. 1) may be exposed through a substantial portion of, for example, the front plate 302. In various embodiments, at least a part of the display 301 may be exposed through the front plate 302 forming the first face 310A and the first areas 310D of the side faces 310C. In various embodiments, the edges of the display 301 may be formed to have substantially the same shape as that of the outer edge of the front plate 302 adjacent thereto. In another embodiment (not illustrated), the distance between the outer edges of the display 301 and the outer edges of the front plate 302 may be substantially constant in order to enlarge the exposed area of the display 301.

In another embodiment (not illustrated), a recess or an opening may be formed in a part of a screen display area (e.g., an active area) of the display 301 or an area out of the screen display area (e.g., an inactive area), and at least one of the audio module 314 (e.g., the audio module 170 in FIG. 1), the sensor module 304 (e.g., the sensor module 176 in FIG. 1), the camera modules 305 (e.g., the camera module 180 in FIG. 1), and the light-emitting elements 306 may be aligned with the recess or the opening. In another embodiment (not illustrated), at least one of the audio module 314, the sensor module 304, the camera module 305, the fingerprint sensor 316, and the light-emitting element 306 may be included in the rear face of the screen display area of the display 301. In another embodiment (not illustrated), the display 301 may be coupled to or disposed adjacent to a touch-sensing circuit, a pressure sensor that is capable of measuring the intensity of a touch (pressure), and/or a digitizer that detects a magnetic-field-type stylus pen. In some embodiments, at least some of the sensor modules 304 and 319 and/or at least some of the key input devices 317 may be disposed in the first areas 310D and/or the second areas 310E.

The audio modules 303, 307, and 314 may include a microphone hole 303 and speaker holes 307 and 314. The microphone hole 303 may include a microphone disposed therein so as to acquire external sound, and in various embodiments, multiple microphones may be disposed therein so as to detect the direction of sound. The speaker holes 307 and 314 may include an external speaker hole 307 and a phone call receiver hole 314. In some embodiments, the speaker holes 307 and 314 and the microphone hole 303 may be implemented as a single hole, or a speaker may be included without the speaker holes 307 and 314 (e.g., a piezo speaker).

The sensor module 304, 316, or 319 may generate an electrical signal or data value corresponding to an internal operating state or an external environmental condition of the electronic device 101. The sensor modules 304, 316, and 319 may include, for example, a first sensor module 304 (e.g., a proximity sensor) and/or a second sensor module (not illustrated) (e.g., a fingerprint sensor) disposed on the first face 310A of the housing 310, and/or a third sensor module 319 (e.g., an HRM sensor) and/or a fourth sensor module 316 (e.g., a fingerprint sensor) disposed on the second face 310B of the housing 310. The fingerprint sensor may be disposed not only on the first face 310A (e.g., the display 301) of the housing 310, but also on the second face 310B. The electronic device 101 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304.

The camera modules 305, 312, and 313 may include a first camera device 305 disposed on the first face 310A of the electronic device 101, a second camera device 312 disposed on the second face 310B, and/or a flash 313. The camera modules 305 and 312 may include one or more lenses, an image sensor, and/or an image signal processor. The flash 313 may include, for example, a light-emitting diode or a xenon lamp. In various embodiments, two or more lenses (e.g., an infrared camera lens, a wide-angle lens, and a telephoto lens) and image sensors may be disposed on one face of the electronic device 101.

The key input devices 317 may be disposed on the side face 310C of the housing 310. In another embodiment, the electronic device 101 may not include some or all of the above-mentioned key input devices 317, and a key input device 317, which is not included therein, may be implemented in another form of a soft key or the like on the display 301. In some embodiments, the key input devices may include a sensor module 316 disposed on the second face 310B of the housing 310.

The light-emitting element 306 may be disposed, for example, on the first face 310A of the housing 310. The light-emitting element 306 may provide, for example, the status information of the electronic device 101 in an optical form. In another embodiment, the light-emitting element 306 may provide a light source that is interlocked with, for example, the operation of the camera module 305. The light-emitting element 306 may include, for example, an LED, an IR LED, and a xenon lamp.

The connector holes 308 and 309 may include a first connector hole 308 that is capable of accommodating a connector (e.g., a USB connector) for transmitting and receiving power and/or data to and from an external electronic device, and/or a second connector hole 309 that is capable of receiving a connector (e.g., an earphone jack) for transmitting and receiving an audio signal to and from an electronic device.

Figure 5:
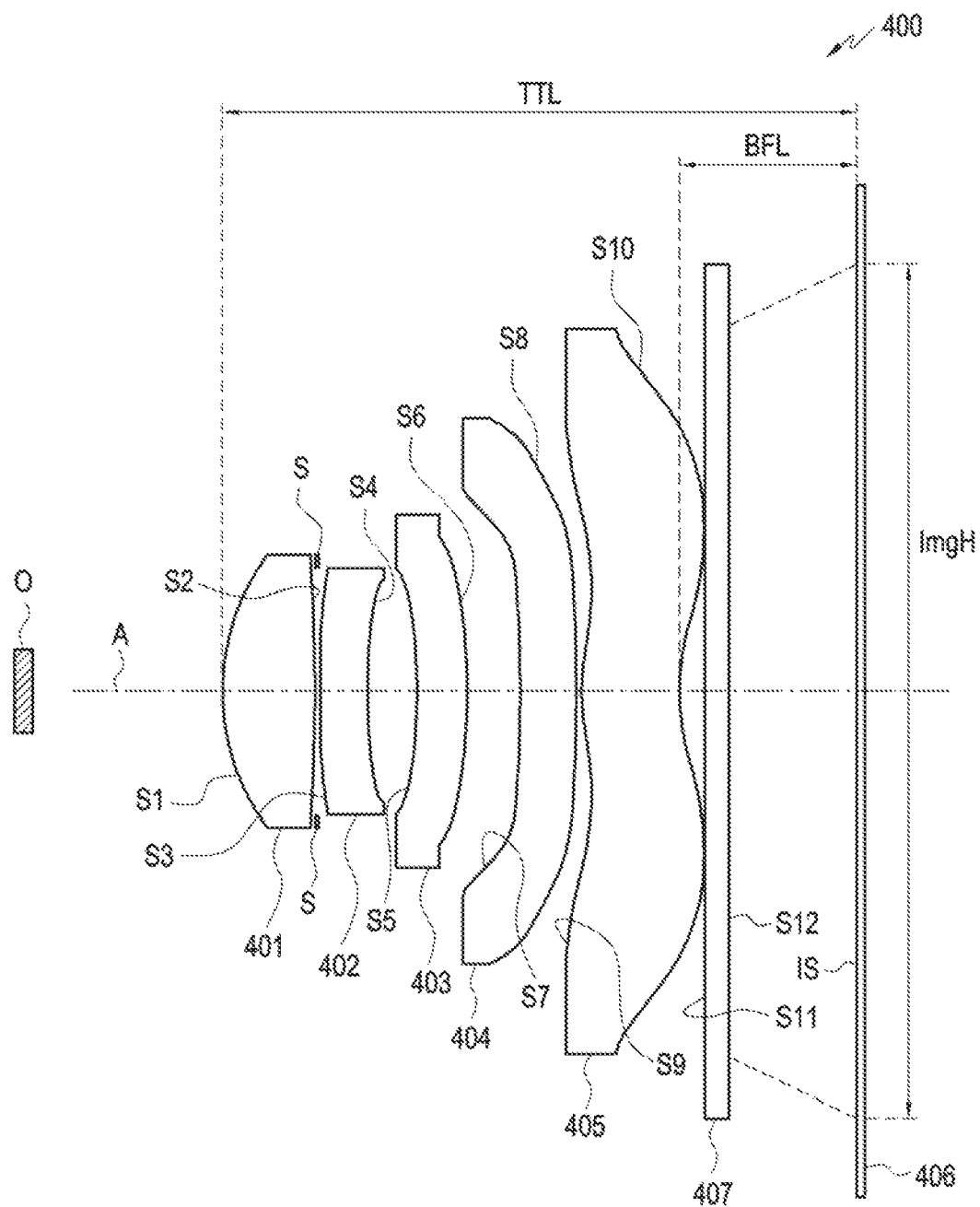
FIG. 5 is a configuration view illustrating a lens assembly according to one of various embodiments.

FIG. 5 is a configuration view illustrating a lens assembly 400 according to one of various embodiments.

Referring to FIG. 5, according to one of various embodiments, the lens assembly 400 (e.g., the lens assembly 210 in FIG. 2) may include a plurality of lenses 401, 402, 403, 404, and 405, and may further include an image sensor 406 in some embodiments. For example, the image sensor 406 may be mounted on an electronic device (e.g., the electronic device 101 in FIG. 1 or FIG. 3) or an optical device (e.g., the camera module 280 in FIG. 2), and the plurality of lenses 401, 402, 403, 404, and 405 constituting the lens assembly 400 may be mounted on the electronic device or the optical device while being aligned with the image sensor 406 (i.e. the centers of the lenses and the image sensor may be aligned along the optical axis A). In an embodiment, the lens assembly 400 may be disposed in any one of the camera modules 305, 312, and 313 of FIG. 3 or FIG. 4.

According to an embodiment, the plurality of lenses 401, 402, 403, 404, and 405 may include a first lens 401, a second lens 402, a third lens 403, a fourth lens 404, and/or a fifth lens 405, which are sequentially disposed from the subject O side towards the image sensor 406. For example, the first to fifth lenses 401, 402, 403, 404, and 405 may be aligned on the optical axis A together with the image sensor 406. According to an embodiment, each of the first to fifth lenses 401, 402, 403, 404, and 405 may be a plastic aspherical lens. In an embodiment, the first lens 401 may have a transmittance ranging from 0% to 5% with respect to visible light. As such, when the lens assembly 401 is mounted on the electronic device 101 illustrated in FIG. 3, the user may not be able to visually distinguish the lens assembly 400 from the rest of the external housing of the electronic device 101.

According to an embodiment, the first lens 401 may have positive refractive power, and may be disposed to face the subject O. When the first lens 401 has positive refractive power, it is possible to reduce the total length (TTL) of the lens assembly 400 (e.g., the distance from the subject side surface S1 of the first lens 401 to the imaging surface IS of the image sensor 406) and/or the outer diameters of the second to fourth lenses 402, 403, 404, and 405. In an embodiment, the first lens 401 may be a meniscus lens that is convex towards the subject O side, and the image sensor 406 side surface S2 of the first lens 401 may have an inflection point. That is, on the image sensor 406 side surface S2 of the first lens 401, a curvature radius in the central portion, through which the optical axis A passes, and a curvature radius in the peripheral portion may be different from each other. For example, one curvature radius may be positive while the other curvature radius may be negative. The first lens 401 having the shape described above may enable the lens assembly 400 to have an F-number ranging from 1.5 to 2.0. In an embodiment, the first lens 401 having the shape and the positive refractive power as described above may facilitate miniaturization of the lens assembly 400 and/or correction of spherical aberration.

According to an embodiment, the first lens 401 may be a key factor in minimizing the size of the effective diameter of the lens assembly on the basis of a designated F-number and the size of the image sensor (e.g., 1/3.1 inches or less). As such, it may be possible to provide an optical system having a small-diameter barrel. For example, the first lens 401 is a main factor for determining the sizes of the effective diameters of the second to fifth lenses 402, 403, 404, and 405. And by minimizing the effective diameter of the first lens 401, it will facilitate better design of other elements in the electronic device 101. For example, as the effective diameter of the first lens 401 is minimized, the bezel of the electronic device 101 in which the lens assembly is disposed may also be minimized.

According to an embodiment, the second lens 402 may have positive refractive power or negative refractive power, and may be disposed adjacent to the first lens 401. For example, the second lens 402 may be disposed to face the subject O with a diaphragm S interposed therebetween. In some embodiments, when the first lens 401 has positive refractive power, the second lens 402 may have negative refractive power. The second lens 402 may be a meniscus lens that is convex towards the subject O side at least in the central portion of the subject side surface S3, and the subject side surface S3 and the image sensor side surface S4 thereof may both include an inflection point.

According to an embodiment, the third lens 403 may have negative refractive power, and may be disposed adjacent to the second lens 402. According to an embodiment, the third lens 403 may be a meniscus lens that is convex towards the image sensor 406 side at least in the central portion of the image sensor side surface S6, and the subject side surface S5 and the image sensor side surface S6 may both include an inflection point.

According to an embodiment, when the third lens 403 has negative refractive power, it is possible to reduce the space between the third lens 403 and the fourth lens 404 and thus to provide a leans assembly 400 whose barrel diameter is minimized. For example, when the third lens 403 has positive refractive power, the air gap between the third lens and the fourth lens increases, and the back focal length (BFL) of the lens assembly 400 decreases. Thus, the size of the effective diameter of the fourth lens is relatively increased, which may be disadvantageous if minimizing of the barrel diameter is desired.

According to an embodiment, the fourth lens 404 may have positive refractive power or negative refractive power, and may be disposed adjacent to the third lens 403. In some embodiments, when the first lens 401 has positive refractive power, the second lens 402 has negative refractive power, and the third lens 403 has negative refractive power, the fourth lens 404 may have negative refractive power. In an embodiment, the fourth lens 404 may be a meniscus lens that is convex towards the image sensor 406 side at least in the central portion of the image sensor side surface S8, and the subject O side surface S7 and the image sensor side surface S8 may both include an inflection point.

According to an embodiment, the fifth lens 405 may have positive refractive power or negative refractive power, and may be disposed adjacent to the fourth lens 404. In some embodiments, when the first lens 401 has positive refractive power, the second lens 402 has negative refractive power, the third lens 403 has negative refractive power, and the fourth lens 404 has negative refractive power, the fifth lens 405 may have positive refractive power. In an embodiment, the fifth lens 405 may be a meniscus lens that is convex towards the subject O side in the center portion thereof and is convex towards the image sensor 406 side in at least a portion of the peripheral portion thereof, and the subject O side surface S9 and the image sensor side surface S10 may both include an inflection point.

According to an embodiment, the surfaces of two or more of the first to fifth lenses 401, 402, 403, 404, and 405 may include inflection points. Since a plurality of lens surfaces include inflection points, it may be easier to correct aberration in the lens assembly 400. In an embodiment, light beams, forming an image on the peripheral portion of the imaging surface IS of the image sensor 406 through the combination of the refractive powers and shapes of the first to fifth lenses 401, 402, 403, 404, and 405, may have an incident angle of about 30 degrees. As such, the lens assembly 400 may exhibit an angle of view of 70 degrees or more. In an embodiment, at least the second to fourth lenses 402, 403, and 404 may be made of high-refractive material. The lens assembly 400 including the lenses made of high-refractive material may enhance the resolution of the camera.

According to an embodiment, at least some of the first to fifth lenses 401, 402, 403, 404, and 405 may be meniscus lenses. In a lens assembly including, for example, five lenses, when at least four lenses are meniscus lenses, even if the focal length of the lens assembly 400 is small, the total length of the lens assembly 400 may be miniaturized, and aberration may be corrected well.

According to an embodiment, the lens assembly 400 may include a band-pass filter 407. For example, the band-pass filter 407 may be disposed between the fifth lens 405 and the image sensor 406. In an embodiment, the band-pass filter 407 may substantially block visible light (e.g., having visible light transmittance ranging from 0.0001% to 1%), and may have maximum transmittance (e.g., transmittance ranging from 90% to 99%) with respect to light having a wavelength between 800 nm and 1000 nm (e.g., near-infrared light). As the band-pass filter 407 is disposed as described above, light incident on the image sensor 406 may be substantially limited to light in a specific wavelength band (e.g., the near-infrared band).

According to an embodiment, the band-pass filter 407 may transmit light having a specific wavelength between 800 nm and 1000 nm. For example, the band-pass filter 407 may have a transmittance of at least 95% for light having a wavelength between 350 nm and 850 nm. As another example, the band-pass filter 407 may transmit light having a bandwidth of about ±50 nm and having a center wavelength of at least one of 850 nm, 940 nm, or 980 nm. In another embodiment, the band-pass filter 407 may have a half width of about ±30 nm from the center wavelength, and may block light outside a bandwidth out of about ±50 nm or a half width of about ±30 nm from the center wavelength. In the various embodiments above, although the bandwidth or the half bandwidth around a specific wavelength is described using numerical values, the disclosure is not limited to the stated numerical values. The band-pass filter 407 may be designed or manufactured to have appropriate optical characteristics depending on the required specifications of the lens assembly 400 or a camera module or an electronic device including the lens assembly 400.

According to an embodiment, the electronic device (e.g., the electronic device 101 in FIG. 3) on which the lens assembly 400 is mounted may emit light having near-infrared wavelength using at least a part of a light source device (e.g., the light-emitting element 306 in FIG. 3). In some embodiments, this light source device is embedded in a camera module (e.g., the camera module 280 in FIG. 2) itself or may be disposed adjacent to the camera module (e.g., the camera module 305 in FIG. 3) which is separate from the light-emitting element 306.

According to an embodiment, the light source device (e.g., the light-emitting element 306 in FIG. 3) may include an infrared-emitting diode or a near-infrared laser light source. The light emitted from the light source device may be reflected by the subject O and may be incident on the image sensor 406 through the lens assembly 400. Based on the time taken for the reflected light to reach the image sensor 406, the electronic device (e.g., the processor 120 in FIG. 1 or the image signal processor 260 in FIG. 2) may detect first information (e.g., distance information on the subject O (e.g., depth information)). In an embodiment, the lens assembly 400 may further include the band-pass filter 407, thereby making it a near-infrared camera that suppresses interference of visible light or infrared rays having wavelengths outside the passband. The near-infrared camera may then detect distance information on a subject (e.g., depth) from light having a specific wavelength in the near-infrared passband.

According to an embodiment, the image sensor 406 may be provided in a very small size. For example, the image sensor 406 may have a size of 1/3.1 inches or less. As another example, the image sensor 406 may have a size between 1/10.1 inches and 1/3.1 inches. The barrel of the lenses combined with the miniaturized image sensor 406 is also formed to have a small diameter, and is capable of being easily mounted in the thin bezel of an electronic device.

According to an embodiment, the lens assembly 400 may satisfy Equation 1 as follows.

$$0.6 < TTL/ImgH < 1 \qquad \text{Equation 1}$$

Here, "TTL" represents the total length of the lens assembly 400 (e.g., the distance from the subject side surface S1 of the first lens 401 to the imaging surface IS of the image sensor 406), and "ImgH" represents the maximum image height of an image formed on the imaging surface IS. The term "image height" means twice the distance from the edge of the image formed on the imaging surface IS to the optical axis A. When the ratio of the total length TTL to the maximum image height ImgH exceeds 1, it signifies that the total length is relatively large, and thus the lens assembly 400 may be difficult to be mounted in a miniaturized electronic device. When the ratio of the total length TTL to the maximum image height ImgH does not reach 0.6, the total length of the lens assembly 400 may be too short, thereby limiting the number of lenses. When the number of lenses is limited, the number of lens surfaces including an inflection point is also reduced, and aberration correction or the like may be limited. When Equation 1 is satisfied, the lens assembly 400 may have a total length of 3 mm or less while being implemented with five lenses, and may be easy to mount in a miniaturized electronic device while ensuring good performance of the optical device (e.g., the camera module 280 in FIG. 2).

Since the optical device including the lens assembly 400 is able to detect distance information on a subject, distance information on a specific portion of the subject, or the like, the optical device may be used as a security camera, an object recognition camera, an object recognition or user authentication camera, or as part of a thermal imaging camera, and may be combined with other optical devices (e.g., a telephoto camera or a wide-angle camera) so as to provide functions such as augmented reality and 3D scanner functions in small electronic devices such as mobile communication terminals. In some embodiments, the optical device including the lens assembly 400 as described above may be implemented to include at least some of the components of the camera module 280 of FIG. 2.

According to an embodiment, the lens assembly 400 may satisfy Equation 2 as follows.

$$0.25 < BFL/TTL < 0.6 \qquad \text{Equation 2}$$

Here, "BFL" is the back focal length (BFL) of the lens assembly 400, for example, and is the distance from the center of the image sensor side surface S10 of the fifth lens 405 to the imaging surface IS of the image sensor 406. When the ratio of the rear focal length BFL to the total length TTL does not reach 0.25, it may signify that the length of the lens assembly 400, in which the lenses 401, 402, 403, 404, and 405 are arranged, is long, and thus the lens assembly 400 may be difficult to be mounted in a miniaturized electronic device and the captured image may be distorted. When Equation 2 is satisfied, the lens assembly 400 may have a total length of 3 mm or less while being implemented with five lenses, and may be easy to mount in a miniaturized electronic device while ensuring good performance of the optical device (e.g., the camera module 280 in FIG. 2).

According to an embodiment, the lens assembly 400 may satisfy Equation 3 as follows.

$$-120 < f3/f < -6 \qquad \text{Equation 3}$$

Here, "f3" represents the focal length of the third lens 403, and "f" represents the total focal length of the lens assembly 400. When the ratio of the focal length f3 of the third lens 403 to the total focal length f of the lens assembly 400 exceeds −6, the miniaturization of the lens assembly 400 may be limited, and when the ratio does not reach −120, it may be difficult to manufacture or combine lenses that satisfy the desired characteristics. For example, on the basis of Equation 3, when the third lens 403 is manufactured with negative refractive power, while the lens assembly 400 including the same is miniaturized, it may be easy to manufacture or combine the lenses 401, 402, 403, 404, and 405.

According to an embodiment, the lens assembly 400 may satisfy Equation 4 as follows.

$$0.3 < T17/TTL < 0.6 \qquad \text{Equation 4}$$

Here, "T17" represents the distance from the subject side surface S1 of the first lens 401 to the subject side surface S7 of the fourth lens 403, and "TTL" represents the total length of the lens assembly 400. When the ratio of T17 to the total length of the lens assembly 400 satisfies Equation 4, while the distance between the third lens 403 and the fourth lens 404 is reduced so that the lens assembly is miniaturized, it may be easy to manufacture or combine the lenses 401, 402, 403, 404, and 405.

According to an embodiment, the lens assembly 400 may satisfy Equation 5 as follows.

$$1.5 < T57 < T67 < 3.5 \qquad \text{Equation 5}$$

Here, "T57" represents the distance from the subject side surface S5 of the third lens 403 to the subject side surface S7 of the fourth lens 404, and "T67" represents the distance from the image sensor side surface S6 of the third lens 403 to the subject side surface S7 of the fourth lens 404. When the ratio of T67 to T57 satisfies Equation 5, while the distance between the third lens 403 and the fourth lens 404 is reduced so that the lens assembly is miniaturized, it may be easy to manufacture or combine the lenses 401, 402, 403, 404, and 405.

According to an embodiment, the lens assembly 400 may satisfy Equation 6 as follows.

$$0.6 < R5 < R6 < 1 \qquad \text{Equation 6}$$

Here, "R5" represents the curvature of the central portion of the subject side surface S5 of the third lens 403, and "R6" represents the curvature of the central portion of the image sensor side surface S6 of the third lens 403. For example, when the third lens 403 is manufactured to have negative refractive power and the ratio of R5 to R6 satisfies Equation 6, the distance between the third lens 403 and the fourth lens 404 is reduced so that the lens assembly 400 may be miniaturized.

According to an embodiment, the lens assembly 400 may satisfy Equation 7 as follows.

$$1.45 < (V2+V4)/V3 < 2.1 \qquad \text{Equation 7}$$

Here, "V2" represents the Abbe number of the second lens 402, "V3" represents the Abbe number of the third lens 403, "V4" represents the Abbe number of the fourth lens 404, and the Abbe number vd of the d-th lens may be defined as a refractive index ratio with respect to a helium d line having a center wavelength of 587.56 nm and may be calculated using Equation 8 as follows.

$$vd = \frac{nd - 1}{nC - nF} \qquad \text{Equation 8}$$

Here, "nd" represents a refractive index at a wavelength of 587.56 nm, "nC" represents a refractive index at a wavelength of 656.27 nm, and "nF" represents a refractive index at a wavelength of 486.413 nm.

By combining lenses that satisfy Equation 8 above, the materials of the lenses may be simplified, and by combining aspherical lenses having high refractive indices, it is possible to configure an optical system (e.g., the lens assembly 400), which is miniaturized while having high-resolution, even with a small number of lenses (e.g., five lenses).

According to an embodiment, the lens assembly 400 may satisfy Equation 9 as follows.

$$0.15 < T58 \text{ImgH} < 0.25 \qquad \text{Equation 9}$$

Here, "T58" represents the distance from the subject side surface S5 of the third lens 403 to the image sensor side surface S6 of the fourth lens 404, and "ImgH" represents the maximum image height of an image formed on the imaging surface IS. When the T58 for the maximum image height ImgH satisfies Equation 9, since it is possible to reduce the total length of the third lens 403 and the fourth lens 404 so that the lens assembly 400 may be miniaturized.

According to an embodiment, the lens assembly 400 may satisfy Equation 10 as follows.

$$-35 < R2-R3/R2+R3 < -0.2 \qquad \text{Equation 10}$$

Here, "R2" represents the curvature of the central portion of the image sensor side surface S2 of the first lens 401, and "R3" represents the curvature of the central portion of the subject side surface S3 of the second lens 402. When the ratio of (R2-R3) to (R2+R3) satisfies Equation 10, even with a small number of lenses (e.g., five lenses), it is possible to configure a miniaturized optical system (e.g., the lens assembly 400) having high resolution.

The lens data of the lens assembly 400 are shown in Table 1 below, in which "S2 (aperture stop)" refers to an aperture surface of the diaphragm S, and "S1 to 513" refer to the surfaces of lenses 401, 402, 403, 404, and 405 and/or the band-pass filter 407. "obj" refers to a subject O, and "img" refers to an image sensor. The lens assembly 400 may include, for example, an image sensor 406 of ¼ inches, may have an F-number of 2.084, a half angle of view of 40.1 degrees, and an effective focal length (EFL) of 2.614, and may satisfy at least one of the equations set forth above.

TABLE 1

| Surface | Surface Type | Curvature Radius (Y-Radius) | Thickness or Air Gap | Refractive Index | Abbe Number | Aperture Surface of Diaphragm (H-Aperture) | Effective Focal Length (EFL) |
|---|---|---|---|---|---|---|---|
| obj | Sphere | inf | 400 | | | | |
| S1 | Asphere | 0.948952 | 0.439651 | 1.544100 | 0.5609 | 0.64 | 1.9207 |
| S2(stop) | Asphere | 8.26939 | 0.031364 | | | 0.589608 | |
| S3 | Asphere | 30.20727 | 0.22 | 1.670740 | 0.1923 | 0.574234 | −5.5663 |
| S4 | Asphere | 3.348833 | 0.236752 | | | 0.516 | |
| S5 | Asphere | −5.5541 | 0.237601 | 1.651000 | 0.2149 | 0.585147 | −54.1666 |
| S6 | Asphere | −6.69108 | 0.259185 | | | 0.754167 | |
| S7 | Asphere | −2.05841 | 0.265 | 1.639150 | 0.2351 | 0.946745 | −5.5162 |
| S8 | Asphere | −5.12486 | 0.025 | | | 1.224548 | |
| S9 | Asphere | 0.86523 | 0.475685 | 1.544100 | 0.5609 | 1.59 | 7.5554 |
| S10 | Asphere | 0.881943 | 0.121866 | | | 1.721427 | |
| S11 | Sphere | inf | 0.11 | 1.516800 | 0.642 | 1.981689 | |
| S12 | Sphere | inf | 0.064046 | | | 2.02101 | |
| S13 | Sphere | inf | 0.548837 | | | 2.059105 | |
| img | Sphere | inf | 0.005 | | | 2.4 | |

The aspherical coefficients of the first to fifth lenses 401, 402, 403, 404, and 405 are represented in Table 2 below in which the definition of the aspherical surface may be calculated using Equation 11 as follows.

$$x = \frac{c'y^2}{1 + \sqrt{1 - (K+1)c'^2 y^2}} + Ay^4 + By^6 + Cy^8 + Dy^{10} + Ey^{12} + Fy^{14} + Gy^{16} + Hy^{18} + Jy^{20} \quad \text{Equation 11}$$

Here, "x" represents the distance from a lens vertex in the direction of the optical axis A, "y" represents the distance in the direction perpendicular to the optical axis A, "c" represents the inverse of the curvature radius at the vertex of the lens, "K" represents a Conic constant, and "A", "B", "C", "D", "E", "F", "G", "H", and "J" represents aspherical coefficients, respectively.

Figure 6:
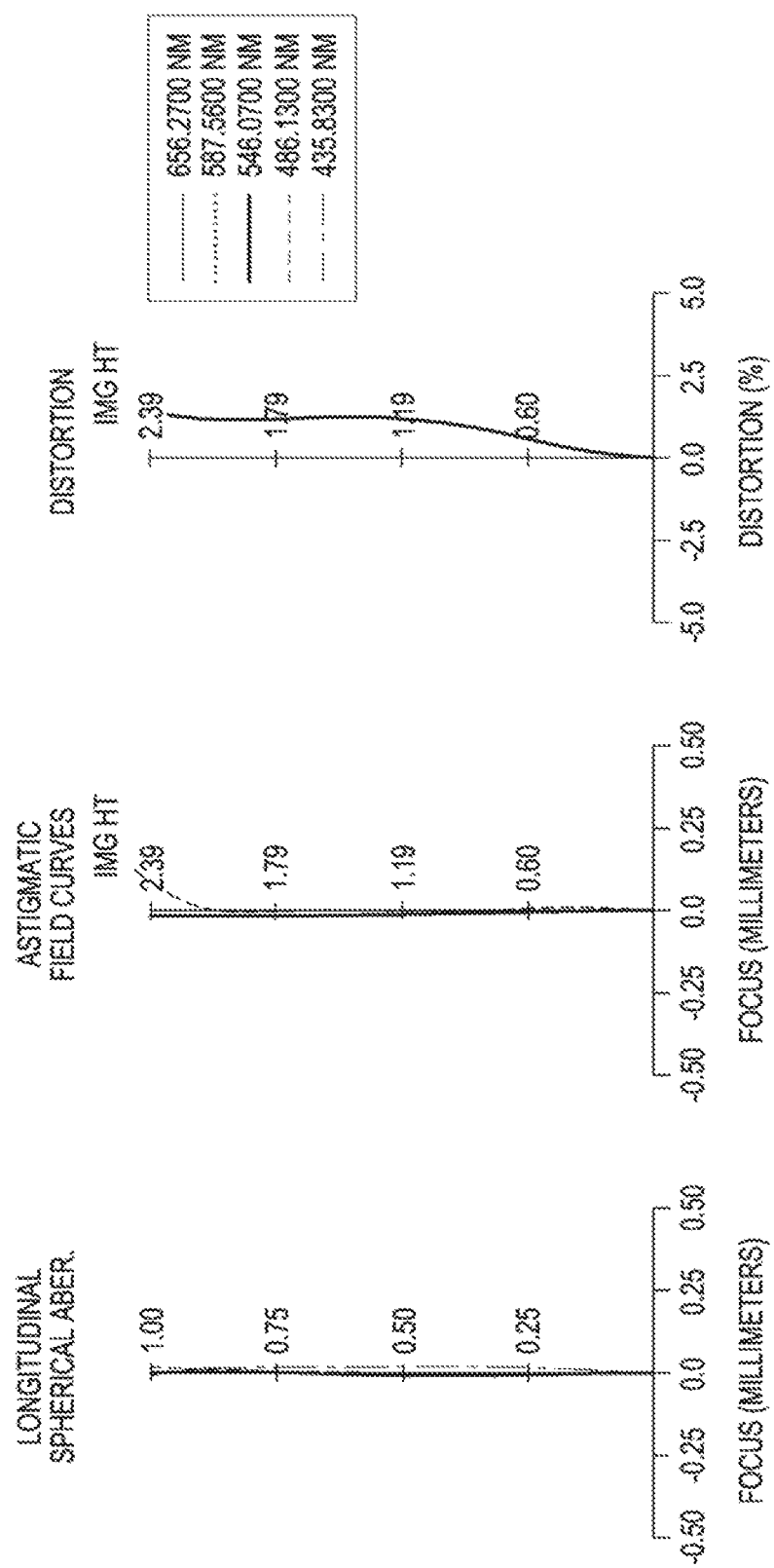
FIG. 6A is a graph representing the spherical aberration of the lens assembly of FIG. 5.
FIG. 6B is a graph representing the astigmatism of the lens assembly of FIG. 5.
FIG. 6C is a graph illustrating the distortion rate of the lens assembly of FIG. 5.

FIG. 6A is a graph representing the spherical aberration of the lens assembly (e.g., the lens assembly 400 in FIG. 5) according to one of various embodiments, FIG. 6B is a graph representing the astigmatism of the lens assembly according to one of various embodiments (e.g., the lens assembly 400 in FIG. 5), and FIG. 6C is a graph illustrating the distortion rate of the lens assembly (e.g., the lens assembly 400 in FIG. 5) according to one of various embodiments.

FIG. 6A is a graph representing the spherical aberration of the lens assembly 400 according to one of various embodiments, in which the horizontal axis represents a longitudinal spherical aberration coefficient and the vertical axis represents a normalized distance from the center of an optical axis. FIG. 6A also represents changes in longitudinal spherical aberration depending on wavelength.

FIG. 6B is a graph representing the astigmatism of the lens assembly 400 according to one of various embodi-

TABLE 2

| Parameter | S1 | S2(stop) | S3 | S4 | S5 |
|---|---|---|---|---|---|
| Yradius | 0.948952 | 8.26939 | 30.20727 | 3.348833 | −5.5541 |
| K | −5.09179 | 48.10044 | 99 | 19.28957 | 29.42742 |
| A | 0.64122 | −0.35304 | −0.11364 | 0.125082 | −0.2437 |
| B | −0.04403 | 0.00465 | 1.863028 | 2.681466 | −3.65219 |
| C | −14.4721 | 5.653617 | −20.2496 | −54.2484 | 44.82336 |
| D | 138.887 | −71.2169 | 224.2517 | 844.0599 | −445.446 |
| E | −760.388 | 551.2474 | −1416.58 | −7861.88 | 3094.674 |
| F | 2531.855 | −2655.49 | 5226.176 | 44535.94 | −13856.6 |
| G | −5106.08 | 7523.522 | −11053.1 | −149578 | 37336.14 |
| H | 5695.148 | −11475.5 | 12320.87 | 273396.6 | −54458.9 |
| J | −2686.06 | 7285.141 | −5490.47 | −208834 | 32662.64 |

| Parameter | S6 | S7 | S8 | S9 | S10 |
|---|---|---|---|---|---|
| Yradius | −6.69108 | −2.05841 | −5.12488 | 0.86523 | 0.881943 |
| K | 73.37124 | −96.6329 | −8.20068 | −10.8649 | −5.23509 |
| A | 0.151439 | 0.944075 | 0.061222 | −0.73012 | −0.48192 |
| B | −5.40466 | −4.51588 | 1.463921 | 0.71198 | 0.513135 |
| C | 39.98056 | 14.83103 | −7.39751 | −0.32261 | −0.38866 |
| D | −220.635 | −49.2334 | 16.99053 | 0.124267 | 0.07895 |
| E | 836.4911 | 123.9751 | −25.0307 | −0.10793 | 0.150297 |
| F | −2062.48 | −215.986 | 24.30435 | 0.083916 | −0.1495 |
| G | 3145.589 | 234.2425 | −14.6759 | −0.03572 | 0.060511 |
| H | −2663.57 | −136.825 | 4.93393 | 0.007763 | −0.01166 |
| J | 950.9062 | 32.32187 | −0.70256 | −0.00069 | 8.77E−04 | ments, and FIG. 6C is a graph illustrating the distortion rate of the lens assembly 400 according to one of various embodiments.

Referring to FIG. 6C, an image captured through the lens assembly 400 may have some distortion generated at a point deviating from the optical axis A, but such distortion ordinarily occurs in an optical device that uses an optical lens or a lens assembly. The distortion rate is about 1%, and thus it is possible to provide a good optical characteristic.

In the following detailed description, the components, which can be easily understood through the preceding embodiments, may be denoted by the same reference numerals as the preceding embodiments or the reference numerals may be omitted, and detailed descriptions thereof may also be omitted.

Figure 7:
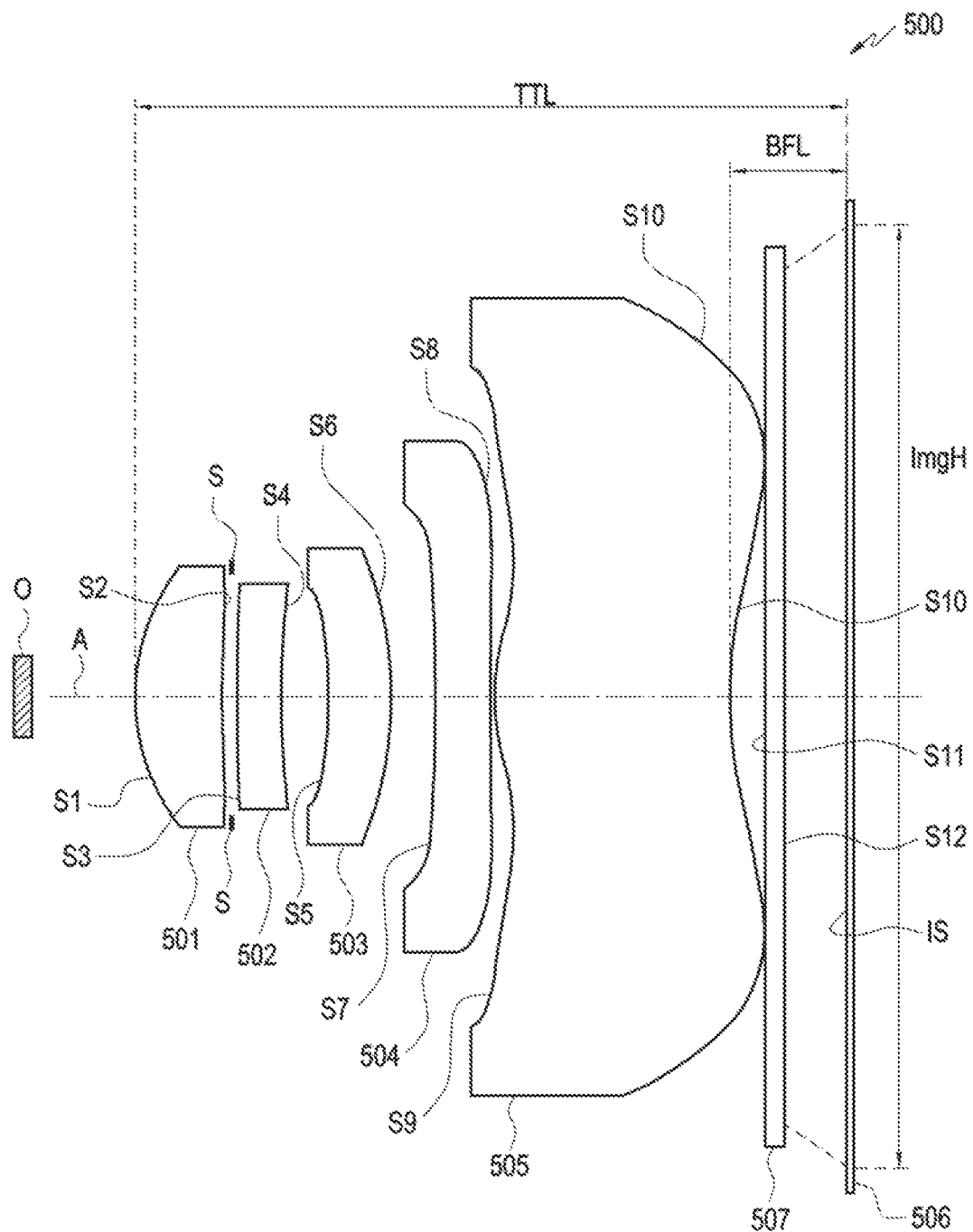
FIG. 7 is a view illustrating the configuration of a lens assembly according to another one of various embodiments.
Figure 8:
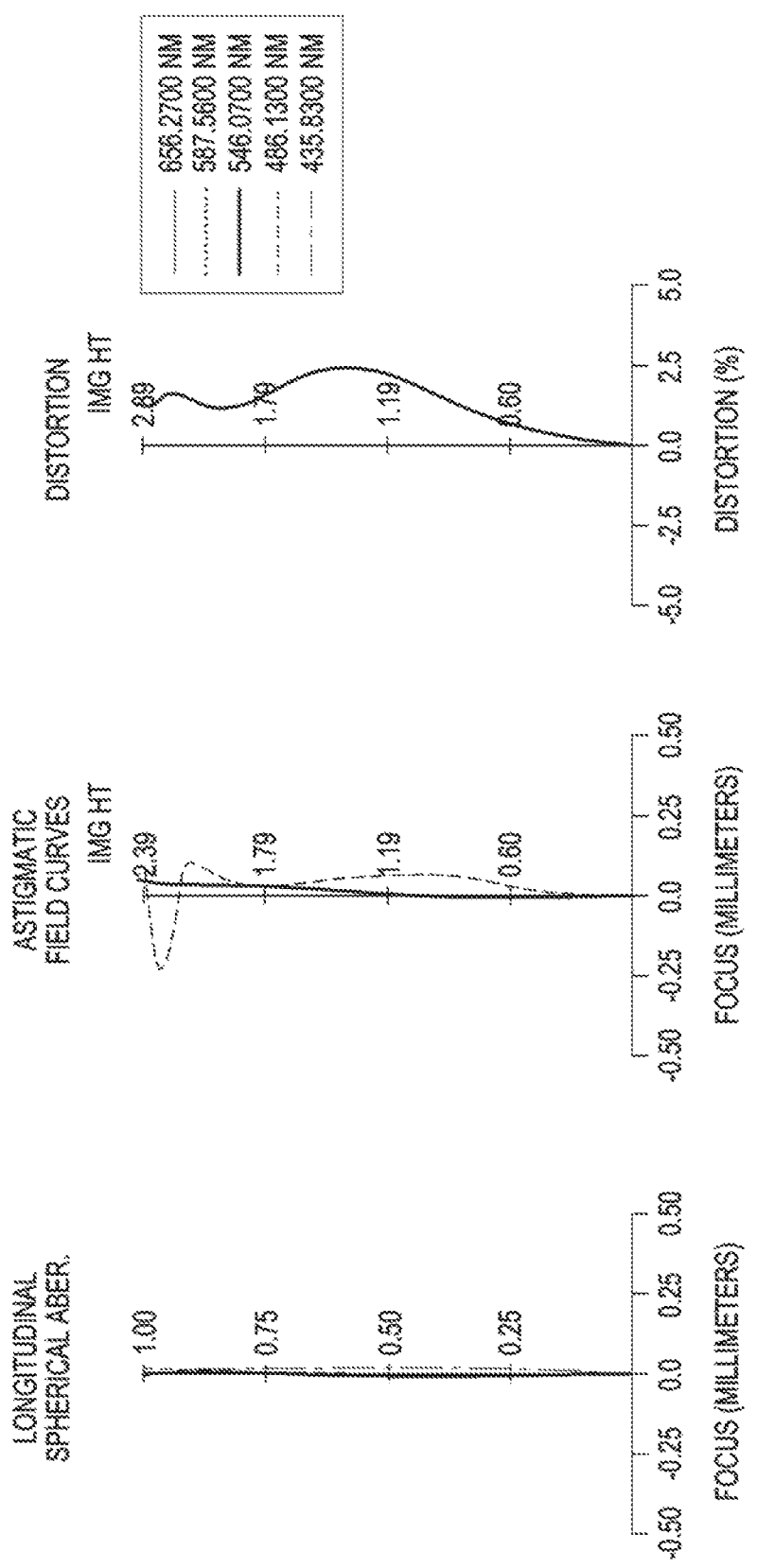
FIG. 8A is a graph representing the spherical aberration of the lens assembly of FIG. 7.
FIG. 8B is a graph representing the astigmatism of the lens assembly of FIG. 7.
FIG. 8C is a graph illustrating the distortion rate of the lens assembly of FIG. 7.

FIG. 7 is a view illustrating the configuration of a lens assembly 500 according to another one of various embodiments. FIG. 8A is a graph representing the spherical aberration of the lens assembly 500 according to another one of various embodiments, FIG. 8B is a graph representing the astigmatism of the lens assembly 500 according to another one of various embodiments, and FIG. 8C is a graph illustrating the distortion rate of the lens assembly 500 according to another one of various embodiments. Collectively, FIGS. 7-8C illustrate Example 2 of the instant disclosure.

Referring to FIG. 7 and FIGS. 8A to 8C, the lens assembly 500 may include first to fifth lenses 501, 502, 503, 504, and 505, and a band-pass filter 507, and the first to fifth lenses 501, 502, 503, 504, and 505 may be sequentially arranged along the optical axis A from the subject O side towards the image sensor 506 side. Although there are some differences in details, such as shapes, lens data, or the like of the first to fifth lenses 501, 502, 503, 504, and 505, the lens assembly 500 may satisfy at least one of the conditions described through the preceding embodiment. The phrase "conditions described through the preceding embodiment" may include the transmittance characteristic of the first lens 501 (e.g., the first lens 401 in FIG. 5), the refractive powers or lens surface shapes of the first to fifth lenses 501, 502, 503, 504, and 505, the configurations of lens surfaces including various inflection points, the conditions presented through Equations 1 to 10, the materials of the first to fifth lenses 501, 502, 503, 504, and 505, and the configuration of the image sensor 506.

According to an embodiment, the fifth lens 505 of the lens assembly 500 may be corrected in thickness and curvature compared with the fifth lens 405 in FIG. 5 so as to be improved such that the flange back length (FBL) decreases and the value of TTL/ImgH increases.

The lens data of the lens assembly 500 are represented in Table 3 below, in which "S2 (aperture stop)" refers to an aperture surface of the diaphragm S, "obj" refers to a subject, and "img" refers to an image sensor. "S1 to S13" refer to the surfaces of the lenses 501, 502, 503, 504, and 505 and/or the band-pass filter 507. The lens assembly 500 may include, for example, an image sensor 406 of ¼ inches, may have an F-number of 2.084, a half angle of view of 37.1 degrees, and an effective focal length (EFL) of 2.614, and may satisfy at least one of the equations set forth above.

TABLE 3

| Surface | Surface Type | Curvature Radius (Y-Radius) | Thickness or Air Gap | Refractive Index | Abbe Number | Aperture Surface of Diaphragm (H-Aperture) | Effective Focal Length (EFL) |
|---|---|---|---|---|---|---|---|
| obj | Sphere | inf | 400 | | | | |
| S1 | Asphere | 0.998177218 | 0.421696492 | 1.544100 | | 0.64 | 2.1114 |
| S2(stop) | Asphere | 6.299238176 | 0.061988883 | | | 0.579868079 | |
| S3 | Asphere | −30.02313879 | 0.22 | 1.670740 | 0.1923 | 0.56580755 | −9.4493 |
| S4 | Asphere | 8.182912345 | 0.218666282 | | | 0.516 | |
| S5 | Asphere | −3.613007436 | 0.29383281 | 1.651000 | 0.2149 | 0.562103535 | −16.5225 |
| S6 | Asphere | −5.585493211 | 0.22 | | | 0.720422114 | |
| S7 | Asphere | −2.277420828 | 0.265 | 1.639150 | 0.2351 | 0.9329088 | −4.4721 |
| S8 | Asphere | −11.27821421 | 0.025 | | | 1.249008969 | |
| S9 | Asphere | 1.326527363 | 1.133492885 | 1.544100 | 0.5609 | 1.59 | 3.9795 |
| S10 | Asphere | 2.374760732 | 0.161013929 | | | 1.948303453 | |
| S11 | Sphere | inf | 0.11 | 1.5168002 | 0.642 | 1.981689 | |
| S12 | Sphere | inf | 0.064045787 | | | 2.02101 | |
| S13 | Sphere | inf | 0.250262932 | | | 2.059105 | |
| img | Sphere | inf | 0.005 | | | 2.4 | |

The aspherical coefficients of the first to fifth lenses 501, 502, 503, 504, and 505 are represented in Table 4 below.

TABLE 4

| Parameter | S1 | S2(stop) | S3 | S4 | S5 |
|---|---|---|---|---|---|
| Yradius | 0.998177218 | 6.299238 | −30.0231 | 8.182912 | −3.61301 |
| K | −4.637697024 | 79.80862 | 446.725 | −290.691 | 32.28146 |
| A | 0.491027869 | −0.50759 | −0.14573 | 0.16625 | −0.51613 |
| B | 2.318345114 | 11.86637 | 4.610892 | −1.22608 | 2.319639 |
| C | −50.70125978 | −221.104 | −71.6236 | 12.8307 | −68.8169 |
| D | 491.530604 | 2408.43 | 784.853 | 204.0703 | 980.3153 |
| E | −2804.492459 | −16017.2 | −5233.26 | −4545.26 | −8116.39 |
| F | 9759.290717 | 65776 | 21138.69 | 36984.51 | 40217.21 |
| G | −20345.23664 | −162931 | −50203.7 | −154997 | −116852 |
| H | 23293.79001 | 223171 | 64090.28 | 333174.5 | 182193.1 |

TABLE 4-continued

| | | | | | |
|---|---|---|---|---|---|
| J | −11257.59862 | −129811 | −33516.4 | −290135 | −116010 |

| Parameter | S6 | S7 | S8 | S9 | S10 |
|---|---|---|---|---|---|
| Yradius | −5.58549 | −2.27742 | −11.2782 | 1.326527 | 2.374761 |
| K | 51.92643 | −59.9803 | −252.24 | −9.18367 | −1.46496 |
| A | 0.004174 | 0.734501 | 0.67628 | 0.058721 | −0.00023 |
| B | −2.25812 | −2.5321 | −3.07337 | −1.45442 | −0.16292 |
| C | 17.8018 | 6.894857 | 7.619134 | 3.419166 | 0.223301 |
| D | −127.866 | −24.463 | −11.6741 | −4.29222 | −0.21107 |
| E | 616.087 | 78.03411 | 11.33602 | 3.200832 | 0.134545 |
| F | −1845.21 | −165.817 | −7.18449 | −1.38688 | −0.05527 |
| G | 3326.285 | 209.1899 | 30.003988 | 0.317129 | 0.013583 |
| H | −3316.5 | −142.018 | −0.78445 | −0.0281 | −0.00178 |
| J | 1416.826 | 39.88854 | 0.098103 | −0.00044 | 9.44E−05 |

Figure 9:
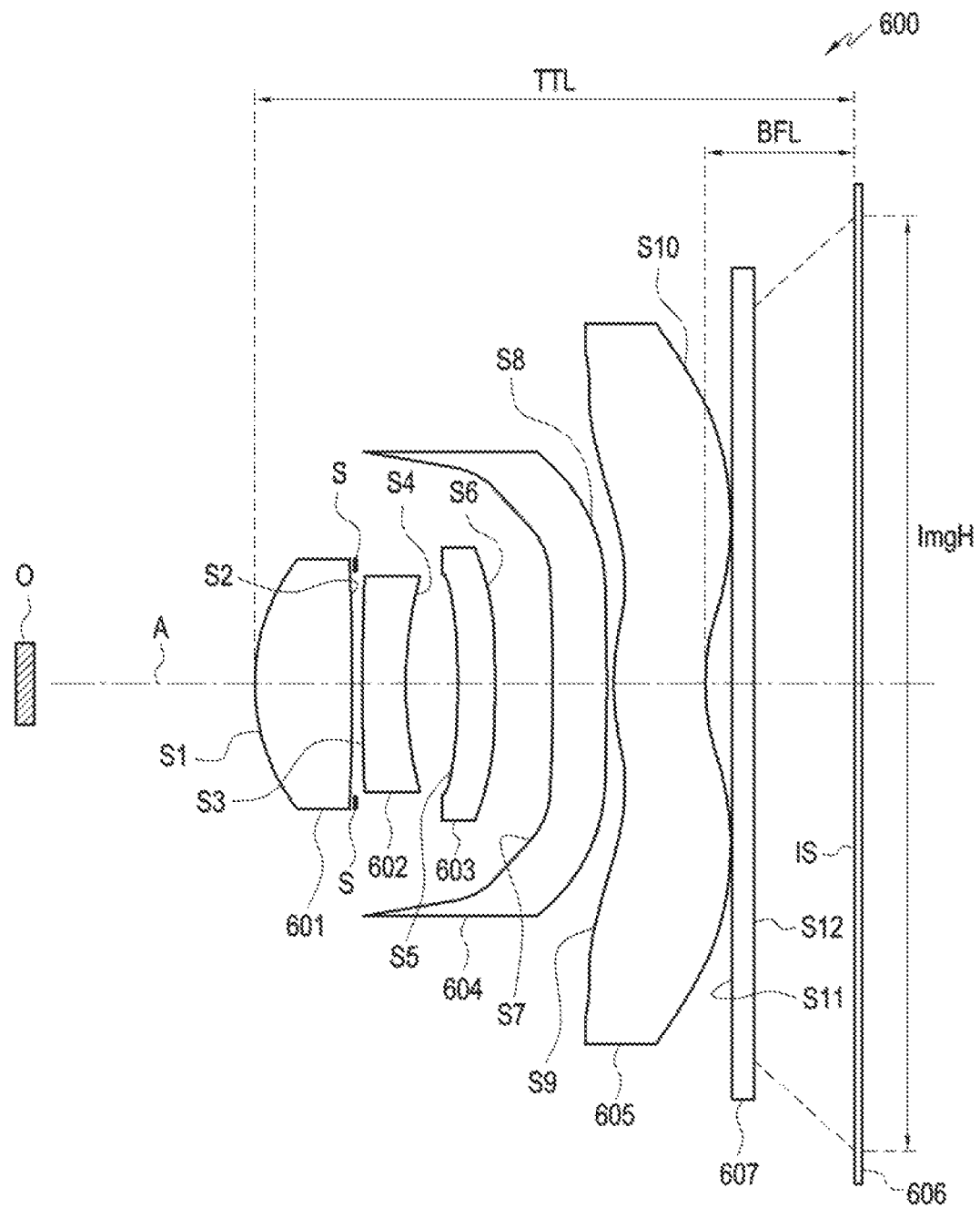
FIG. 9 is a view illustrating the configuration of a lens assembly according to still another one of various embodiments.
Figures 10A, 10B, 10C:
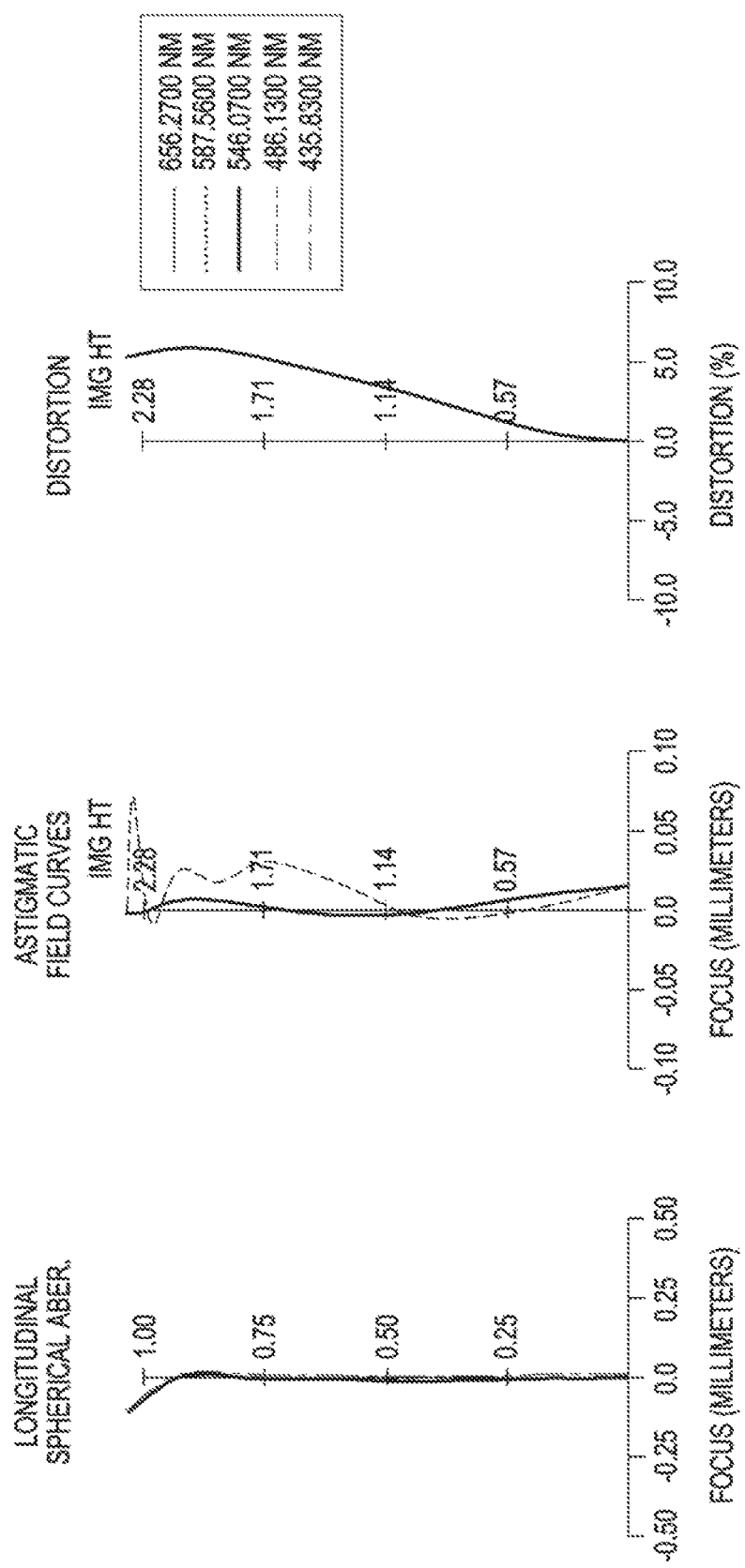
FIG. 10A is a graph representing the spherical aberration of the lens assembly of FIG. 9.
FIG. 10B is a graph representing the astigmatism of the lens assembly of FIG. 9.
FIG. 10C is a graph illustrating the distortion rate of the lens assembly of FIG. 9.

FIG. 9 is a view illustrating the configuration of a lens assembly 600 according to still another one of various embodiments. FIG. 10A is a graph representing the spherical aberration of the lens assembly 600 according to still another one of various embodiments, FIG. 10B is a graph representing the astigmatism of the lens assembly 600 according to still another one of various embodiments, and FIG. 10C is a graph illustrating the distortion rate of the lens assembly 600 according to still another one of various embodiments. Collectively, FIGS. 7-8C illustrate Example 3 of the instant disclosure.

Referring to FIG. 9 and FIGS. 10A to 10C, the lens assembly 600 may include first to fifth lenses 601, 602, 603, 604, and 605 and a band-pass filter 607, and the first to fifth lenses 601, 602, 603, 604, and 605 may be sequentially arranged along the optical axis A from the subject O side towards the image sensor 606 side. Although there are some differences in details, such as shapes, lens data, or the like of the first to fifth lenses 601, 602, 603, 604, and 605, the lens assembly 600 may satisfy at least one of the conditions described through the preceding embodiments.

According to an embodiment, the fourth lens 604 and the fifth lens 605 of the lens assembly 600 are manufactured to have a reduced thickness compared to the fourth lens 404 and the fifth lens 405 of FIG. 5, so that it is possible to obtain an improvement to reduce the value of TTL/ImgH.

The lens data of the lens assembly 600 are represented in Table 5 below, in which "S2 (aperture stop)" refers to an aperture surface of the diaphragm S, "obj" refers to a subject, and "img" refers to an image sensor. "S1 to S13" refer to the surfaces of the lenses 601, 602, 603, 604, and 605 and/or the band-pass filter 607. The lens assembly 600 may include, for example, an image sensor 606 of ¼ inches, may have an F-number of 2.084, a half angle of view of 36.49 degrees, and an effective focal length (EFL) of 2.083, and may satisfy at least one of the equations set forth above.

TABLE 5

| Surface | Surface Type | Curvature Radius (Y-Radius) | Thickness or Air Gap | Refractive Index | Abbe Number | Aperture Surface of Diaphragm (H-Aperture) | Effective Focal Length (EFL) |
|---|---|---|---|---|---|---|---|
| obj | Sphere | inf | 400 | | | | |
| S1 | Asphere | 0.944881 | 0.473543 | 1.544100 | 0.5609 | 0.6 | 1.8896 |
| S2(stop) | Asphere | 9.148395 | 0.040983 | | | 0.549147 | |
| S3 | Asphere | 16.37769 | 0.22 | 1.670740 | 0.1923 | 0.56526 | −5.4786 |
| S4 | Asphere | 3.01456 | 0.2629 | | | 0.516 | |
| S5 | Asphere | −5.3536 | 0.182399 | 1.651000 | 0.2149 | 0.582876 | −45.4856 |
| S6 | Asphere | −6.60772 | 0.285803 | | | 0.701525 | |
| S7 | Asphere | −2.05288 | 0.265 | 1.639150 | 0.2351 | 0.882877 | −7.6139 |
| S8 | Asphere | 3.70385 | 0.03417 | | | 1.11587 | |
| S9 | Asphere | 0.91049 | 0.45 | 1.544100 | 0.5609 | 1.59 | 28.902 |
| S10 | Asphere | 0.797437 | 0.131255 | | | 1.733123 | |
| S11 | Sphere | inf | 0.11 | 1.516800 | 0.642 | 1.955325 | |
| S12 | Sphere | inf | 0.064046 | | | 1.994335 | |
| S13 | Sphere | inf | 0.444727 | | | 2.032069 | |
| img | Sphere | inf | −0.01483 | | | 2.4 | |

The aspherical coefficients of the first to fifth lenses 601, 602, 603, 604, and 605 are represented in Table 6 below.

TABLE 6

| Parameter | S1 | S2(stop) | S3 | S4 | S5 |
|---|---|---|---|---|---|
| Y radius | 0.944881 | 9.148395 | 16.37769 | 3.01456 | −5.3536 |
| K | −4.99006 | 39.13974 | 16.34033 | 18.92179 | 43.15323 |
| A | 0.745839 | −0.46511 | −0.08811 | 0.07627 | −0.13689 |
| B | −3.45417 | 4.104965 | 0.66227 | 5.115544 | −6.94655 |

TABLE 6-continued

| | | | | | |
|---|---|---|---|---|---|
| C | 40.40919 | −71.7751 | 1.874898 | −137.423 | 78.92742 |
| D | −382.689 | 815.3451 | 54.39122 | 2335.348 | −690.03 |
| E | 2288.117 | −5752.7 | −958.698 | −23372.4 | 4305.436 |
| F | −8539.03 | 25134.78 | 6416.57 | 142007.7 | −17701.6 |
| G | 19260.63 | −66251.2 | −21880.4 | −513821 | 44674.16 |
| H | −24052.4 | 96455.09 | 37843.67 | 1017029 | −61881.2 |
| J | 12760.27 | −59555.3 | −26346.2 | −846357 | 35560.85 |

| Parameter | S6 | S7 | S8 | S9 | S10 |
|---|---|---|---|---|---|
| Y radius | −6.60772 | −2.05288 | −3.70385 | 0.91047 | 0.797437 |
| K | 71.89664 | −105.199 | 4.071223 | −12.0987 | −4.93294 |
| A | 0.25363 | 0.843144 | 0.192246 | −0.81011 | −0.60205 |
| B | −7.61306 | −3.43834 | 1.863069 | 1.230095 | 0.964501 |
| C | 55.38231 | 7.397823 | −12.2281 | −1.95739 | −1.30448 |
| D | −301.375 | −23.6034 | 32.22636 | 2.842319 | 1.271673 |
| E | 1184.242 | 71.14351 | −50.7511 | −2.73262 | −0.83008 |
| F | −3136.41 | −144.615 | 50.38995 | 1.618482 | 0.35113 |
| G | 5255.135 | 170.8081 | −30.6853 | −0.57316 | −0.09261 |
| H | −4961.72 | −103.442 | 10.44309 | 0.111768 | 0.013906 |
| J | 1989.556 | 24.62149 | −1.521 | −0.00926 | −9.11E−04 |

Figure 11:
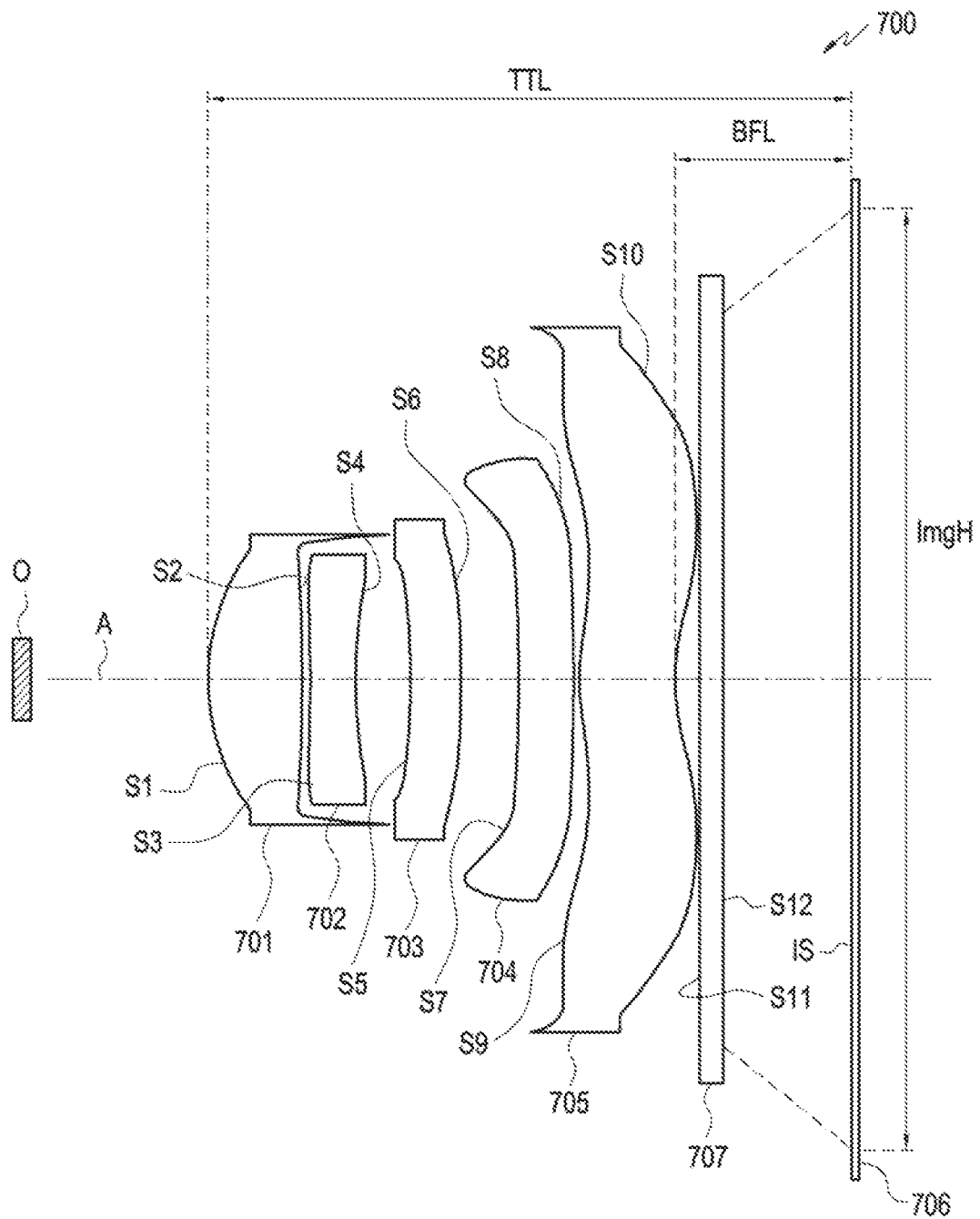
FIG. 11 is a view illustrating the configuration of a lens assembly according to yet another one of various embodiments.
Figure 12:
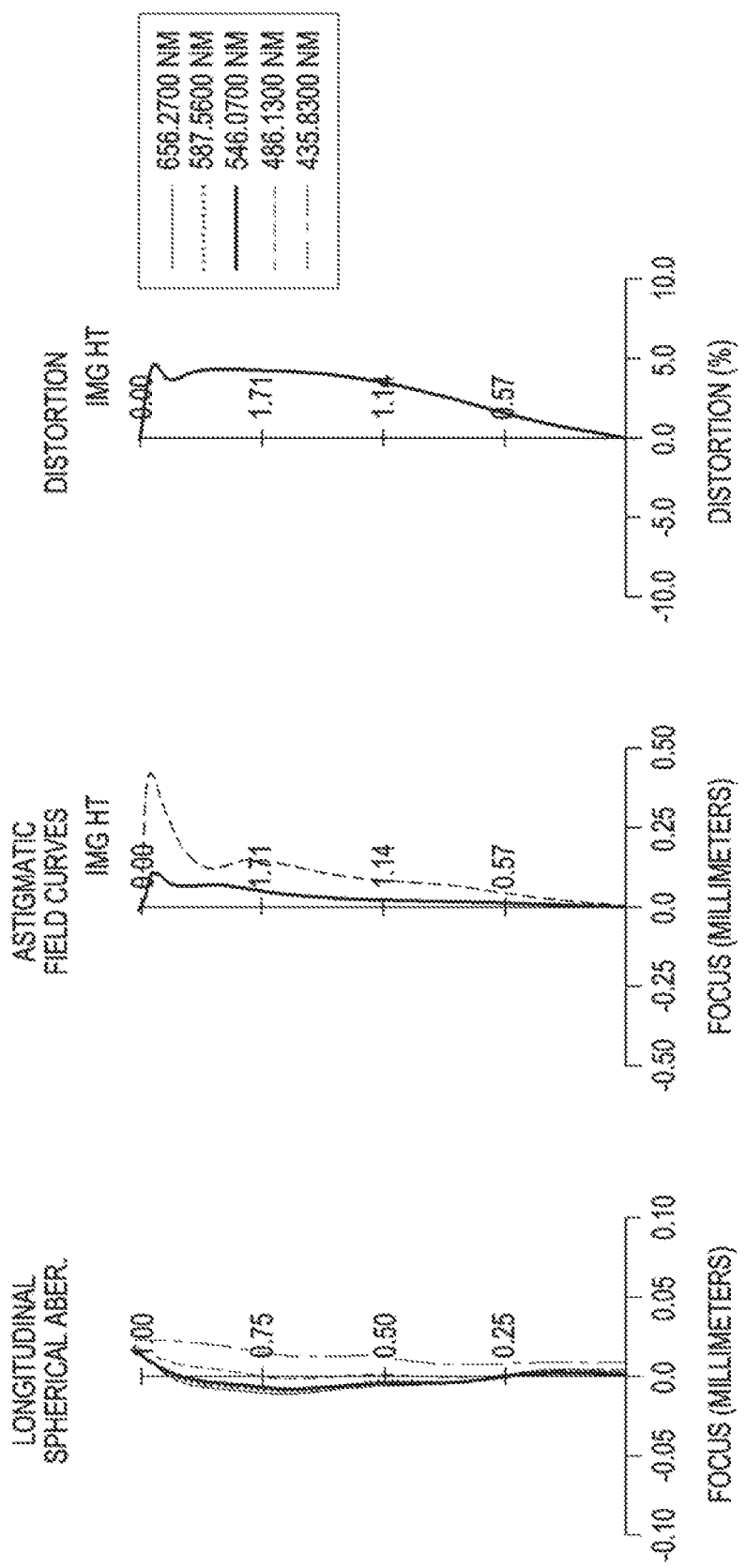
FIG. 12A is a graph representing the spherical aberration of the lens assembly of FIG. 11.
FIG. 12B is a graph representing the astigmatism of the lens assembly of FIG. 11.
FIG. 12C is a graph illustrating the distortion rate of the lens assembly of FIG. 11.

FIG. 11 is a view illustrating the configuration of a lens assembly 700 according to yet another one of various embodiments. FIG. 12A is a graph representing the spherical aberration of the lens assembly 700 according to yet another one of various embodiments, FIG. 12B is a graph representing the astigmatism of the lens assembly 700 according to yet another one of various embodiments, and FIG. 12C is a graph illustrating the distortion rate of the lens assembly 700 according to yet another one of various embodiments. Collectively, FIGS. 7-8C illustrate Example 4 of the instant disclosure.

Referring to FIG. 11 and FIGS. 12A to 12C, the lens assembly 600 may include first to fifth lenses 701, 702, 703, 704, and 705, and a band-pass filter 707, and the first to fifth lenses 701, 702, 703, 704, and 705 may be sequentially arranged along the optical axis A from the subject O side towards the image sensor 706 side. Although there are some differences in details, such as shapes, lens data, or the like of the first to fifth lenses 701, 702, 703, 704, and 705, the lens assembly 700 may satisfy at least one of the conditions described through the preceding embodiments.

According to an embodiment, compared with the lens assembly 400 in FIG. 5, in the lens assembly 700, it is possible to increase the ratio of T57/S67 by designing the curvature of the image sensor side surface of the first lens 701 and the subject side surface of the second lens 702 to be large. Accordingly, it is possible to reduce image distortion.

The lens data of the lens assembly 700 are represented in Table 7 below, in which "S2 (aperture stop)" refers to the aperture surface of the diaphragm S, "obj" refers to a subject, and "img" refers to an image sensor. "S1 to S13" refer to the surfaces of the lenses 701, 702, 703, 704, and 705 and/or the band-pass filter 707. The lens assembly 700 may include, for example, an image sensor 706 of ¼ inches, may have an F-number of 2.17, a half angle of view of 36.8 degrees, and an effective focal length (EFL) of 2.17, and may satisfy at least one of the equations set forth above.

TABLE 7

| Surface | Surface Type | Curvature Radius (Y-Radius) | Thickness or Air Gap (Thickness) | Refractive Index | Abbe Number | Aperture Surface of Diaphragm (H-Aperture) | Effective Focal Length (EFL) |
|---|---|---|---|---|---|---|---|
| obj | Sphere | inf | 400 | | | | |
| S1 | Asphere | 0.950754 | 0.445053 | 1.544100.6 | 0.6 | 0.62 | 1.8934 |
| S2(stop) | Asphere | 9.773565 | 0.041739 | | | 0.554492 | |
| S3 | Asphere | −10.4013 | 0.221504 | 1.670740 | 0.2 | 0.538698 | −4.9811 |
| S4 | Asphere | 5.053745 | 0.24711 | | | 0.48 | |
| S5 | Asphere | −10.1411 | 0.254389 | 651000 | 0.2 | 0.558225 | −76.196 |
| S6 | Asphere | −12.8383 | 0.274129 | | | 0.688363 | |
| S7 | Asphere | −2.06929 | 0.267518 | 639150 | 0.2 | 0.857816 | −5.6525 |
| S8 | Asphere | −5.02257 | 0.025 | | | 1.104885 | |
| S9 | Asphere | 0.857486 | 0.463211 | 544100 | 0.6 | 1.4 | 6.7004 |
| S10 | Asphere | 0.905945 | 0.121866 | | | 1.527953 | |
| S11 | Sphere | inf | 0.11 | 516800 | 0.6 | 1.714016 | |
| S12 | Sphere | inf | 0.064046 | | | 1.751574 | |
| S13 | Sphere | inf | 0.537481 | | | 1.787645 | |
| img | Sphere | inf | 0.010839 | | | 2.4 | |

The aspherical coefficients of the first to fifth lenses 701, 702, 703, 704, and 705 are represented in Table 8 below.

TABLE 8

| Parameter | S1 | S2(stop) | S3 | S4 | S5 |
|---|---|---|---|---|---|
| Y radius | 0.948818 | 8.302844 | 26.44197 | 3.133649 | −5.86065 |
| K | −5.08922 | 47.82378 | 34.89717 | 19.47522 | 32.20366 |
| A | 0.3643649 | −0.36718 | −0.1187 | 0.187368 | −0.2242 |
| B | 0.153052 | 0.891083 | 2.369519 | −2.76687 | −5.1561 |
| C | −21.0849 | −18.2109 | −35.0824 | 137.3035 | 92.09631 |
| D | 227.0177 | 270.1862 | 436.9573 | −2724.39 | −1146.77 |
| E | −1410.19 | −2299.98 | −3137.49 | 30984.27 | 8817.311 |
| F | 5349.635 | 11733.27 | 13397.42 | −210379 | −41424.9 |
| G | −12220.9 | −35716.2 | −33482.7 | 842616.5 | 115694.3 |
| H | 15358.12 | 59753.22 | 45058.29 | −1835388 | −175951 |
| J | −8135.13 | −42216.2 | −25024.1 | 1676372 | 111819.3 |

| Parameter | S6 | S7 | S8 | S9 | S10 |
|---|---|---|---|---|---|
| Y radius | −6.12993 | −2.03885 | −5.25679 | 0.859745 | 0.858195 |
| K | 72.35352 | −95.2123 | −4.05494 | −10.8389 | −5.28375 |
| A | 0.051946 | 0.917604 | 0.086166 | −0.72566 | −0.51043 |
| B | −2.44943 | −4.56085 | 1.191464 | 0.726677 | 0.596133 |
| C | 2.616576 | 16.58902 | −6.13683 | −0.41143 | −0.51147 |
| D | 48.48696 | −59.3921 | 13.58992 | 0.30772 | 0.165849 |
| E | −349.02 | 154.6618 | −19.4145 | −0.31502 | 0.139629 |
| F | 1169.799 | −269.66 | 18.48142 | 0.223047 | −0.17451 |
| G | −2159.14 | 289.3109 | −10.9525 | −0.09118 | 0.077366 |
| H | 2126.911 | −168.188 | 3.588525 | 0.019863 | −0.01603 |
| J | −874.041 | 40.09357 | −0.49227 | −0.0018 | 1.29E−03 |

Figure 13:
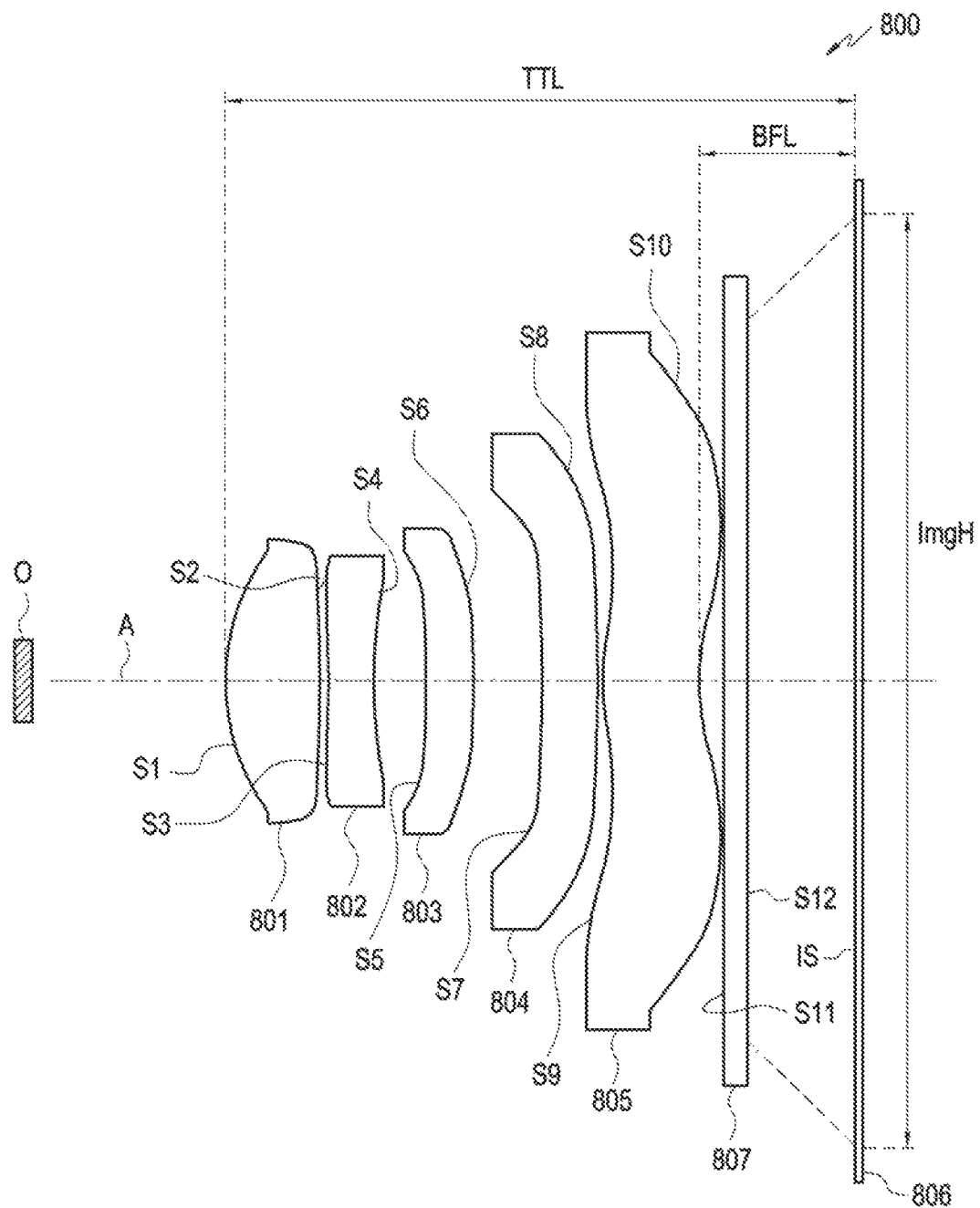
FIG. 13 is a view illustrating the configuration of a lens assembly according to yet another one of various embodiments.
Figure 14:
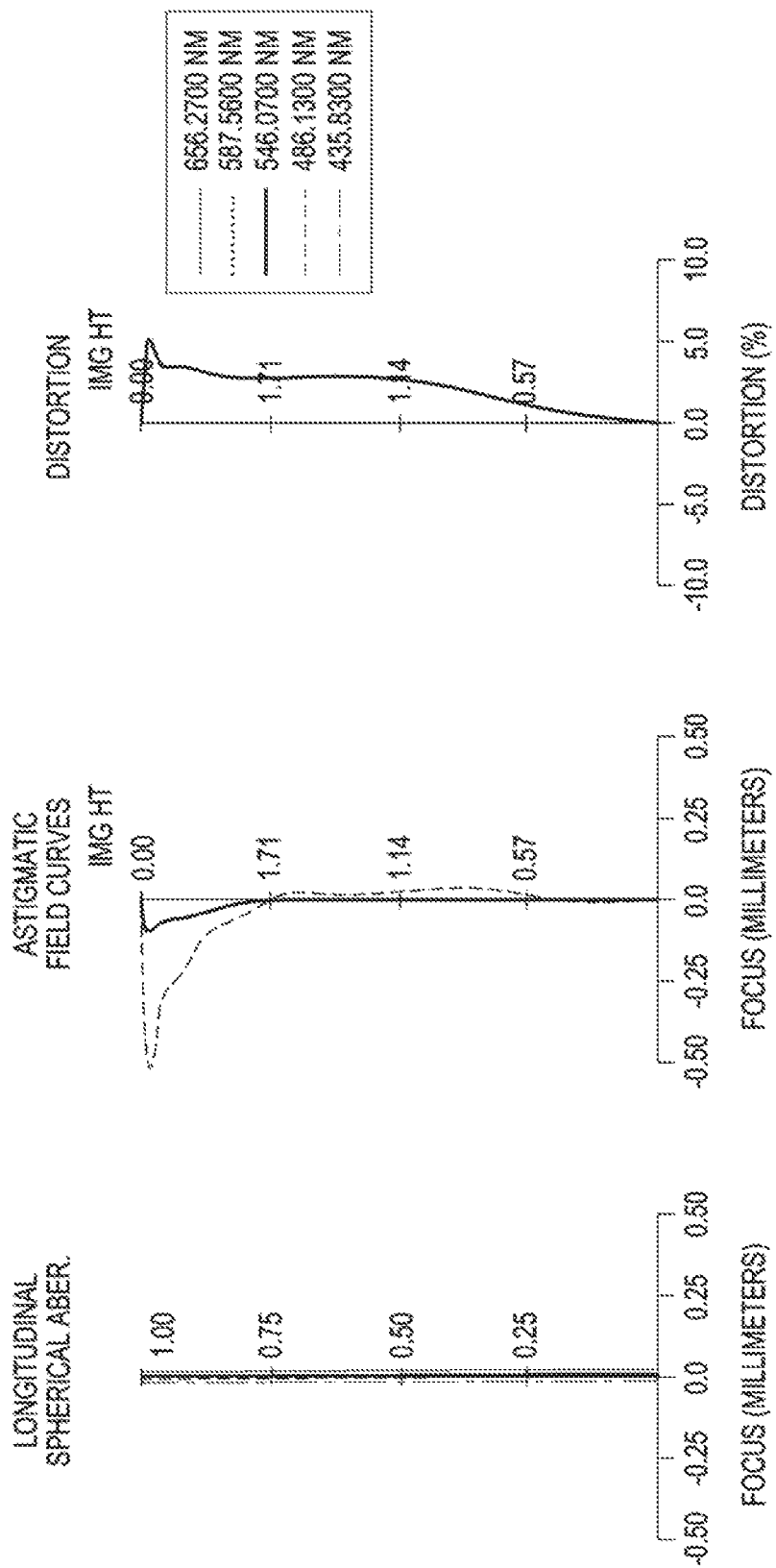
FIG. 14A is a graph representing the spherical aberration of the lens assembly of FIG. 13.
FIG. 14B is a graph representing the astigmatism of the lens assembly of FIG. 13.
FIG. 14C is a graph illustrating the distortion rate of the lens assembly of FIG. 13.

FIG. 13 is a view illustrating the configuration of a lens assembly 800 according to yet another one of various embodiments. FIG. 14A is a graph representing the spherical aberration of the lens assembly 800 according to yet another one of various embodiments, FIG. 14B is a graph representing the astigmatism of the lens assembly 700 according to yet another one of various embodiments, and FIG. 14C is a graph illustrating the distortion rate of the lens assembly 700 according to yet another one of various embodiments. Collectively, FIGS. 7-8C illustrate Example 5 of the instant disclosure.

Referring to FIG. 13 and FIGS. 14A to 14C, the lens assembly 800 may include first to fourth lenses 802, 803, 804, and 805 and a band-pass filter 807, and the first to fourth lenses 802, 803, 804, and 805 may be sequentially arranged along the optical axis A from the subject O side towards the image sensor 806 side. Although there are some differences in details, such as shapes, lens data, or the like of the first to fifth lenses 801, 802, 803, 804, and 805, the lens assembly 800 may satisfy at least one of the conditions described through the preceding embodiments.

According to an embodiment, compared with the lens assembly 400 in FIG. 5, in the lens assembly 800, it is possible to implement a structure in which the value of TTL/ImgH is small and the value of BFL is large by designing the value of f3/f to be large.

The lens data of the lens assembly 800 are represented in Table 9 below, in which "S2 (aperture stop)" refers to an aperture surface of the diaphragm S, "obj" refers to a subject, and "img" refers to an image sensor. "S1 to S13" refer to the surfaces of the lenses 801, 802, 803, 804, and 805 and/or the band-pass filter 807. The lens assembly 800 may include, for example, an image sensor 806 of ¼ inches, may have an F-number of 2.17, a half angle of view of 37.16 degrees, and an effective focal length (EFL) of 2.17, and may satisfy at least one of the equations set forth above.

TABLE 9

| Surface | Surface Type | Curvature Radius (Y-Radius) | Thickness or Air Gap | Refractive Index | Abbe Number | Aperture Surface of Diaphragm (H-Aperture) | Effective Focal Length (EFL) |
|---|---|---|---|---|---|---|---|
| obj | Sphere | inf | 400 | | | | |
| S1 | Asphere | 0.948818 | 0.441524 | 1.544100 | 0.6 | 0.62 | 1.9194 |
| S2(stop) | Asphere | 8.302844 | 0.039192 | | | 0.552286 | |
| S3 | Asphere | 26.44197 | 0.221682 | 1.661989 | 0.3 | 0.535263 | −5.3447 |
| S4 | Asphere | 3.133649 | 0.266638 | | | 0.48 | |
| S5 | Asphere | −5.86065 | 0.219234 | 1.657650 | 0.3 | 0.581953 | −297.916 |
| S6 | Asphere | −6.12993 | 0.314802 | | | 0.713104 | |
| S7 | Asphere | −2.03885 | 0.275581 | 1.634988 | 0.3 | 0.844314 | −5.385 |
| S8 | Asphere | −5.25679 | 0.025 | | | 1.056607 | |
| S9 | Asphere | 0.859745 | 0.464564 | 1.544100 | 0.6 | 1.4 | 8.3023 |
| S10 | Asphere | 0.858195 | 0.121866 | | | 1.490146 | |
| S11 | Sphere | inf | 0.11 | 1.516800 | 0.6 | 1.679357 | |
| S12 | Sphere | inf | 0.064046 | | | 1.721055 | |
| S13 | Sphere | inf | 0.461112 | | | 1.761966 | |
| img | Sphere | inf | −2.14E−05 | | | 2.4 | |

The aspherical coefficients of the first to fifth lenses 801, 802, 803, 804, and 805 are represented in Table 10 below.

TABLE 10

| Parameter | S1 | S2(stop) | S3 | S4 | S5 |
|---|---|---|---|---|---|
| Y radius | 0.948818 | 8.302844 | 26.44197 | 3.133649 | −5.86065 |
| K | −5.08922 | 47.82378 | 34.89717 | 19.47522 | 32.20366 |
| A | 0364349 | −0.36718 | −0.1187 | 0.187368 | −0.2242 |
| B | 0.153052 | 0.891083 | 2.369519 | −2.76687 | −5.1561 |
| C | −21.0849 | −18.2109 | −35.0824 | 137.3035 | 92.09631 |
| D | 227.0177 | 270.1862 | 436.9573 | −2724.39 | −1146.77 |
| E | −1410.19 | −2299.98 | −3137.49 | 30984.27 | 8817.311 |
| F | 5349.635 | 11733.27 | 13397.42 | −210379 | −41424.9 |
| G | −12220.9 | −35716.2 | −33482.7 | 842616.5 | 115694.3 |
| H | 15358.12 | 59753.22 | 45058.29 | −1835388 | −175951 |
| J | −8135.13 | −42216.2 | −25024.1 | 1676372 | 111819.3 |

| Parameter | S6 | S7 | S8 | S9 | S10 |
|---|---|---|---|---|---|
| Y radius | −6.12993 | −2.03885 | −5.25679 | 0.859745 | 0.858195 |
| K | 72.35352 | −95.2123 | −4.05494 | −10.8389 | −5.28375 |
| A | 0.051946 | 0.917604 | 0.086166 | −0.72566 | −0.51043 |
| B | −2.44943 | −4.56085 | 1.191464 | 0.726677 | 0.596133 |
| C | 2.616576 | 16.58902 | −6.13683 | −0.41143 | −0.51147 |
| D | 48.48696 | −59.3921 | 13.58992 | 0.30772 | 0.165849 |
| E | −349.02 | 154.6618 | −19.4145 | −0.31502 | 0.139629 |
| F | 1169.799 | −269.66 | 18.48142 | 0.223047 | −0.17451 |
| G | −2159.14 | 289.3109 | −10.9525 | −0.09118 | 0.077366 |
| H | 2126.911 | −168.188 | 3.588525 | 0.019863 | −0.01603 |
| J | −874.041 | 40.09357 | −0.49227 | −0.0018 | 1.29E−03 |

Figure 15:
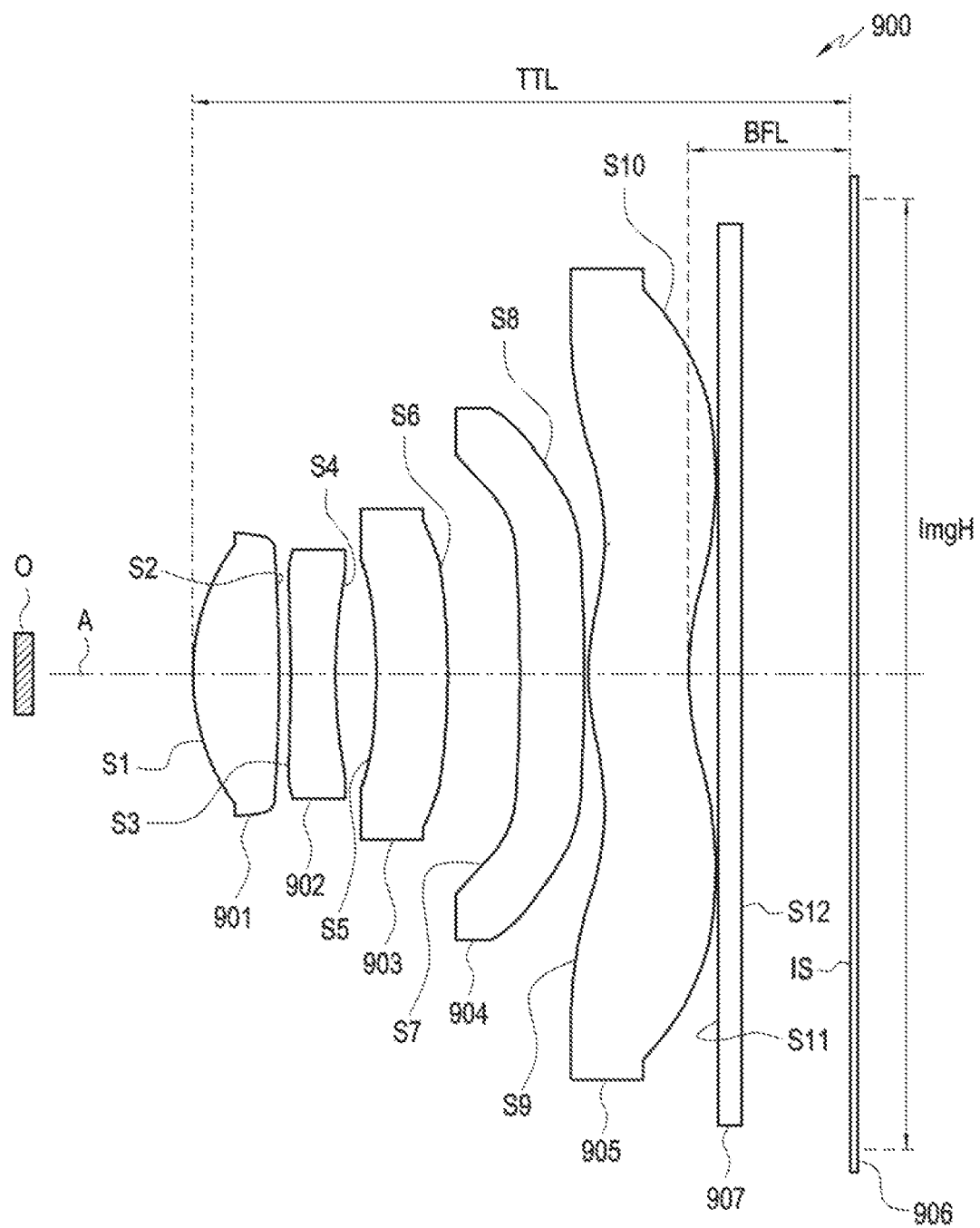
FIG. 15 is a view illustrating the configuration of a lens assembly according to still another one of various embodiments.

FIG. 15 is a view illustrating the configuration of a lens assembly 900 according to still another one of various embodiments. FIG. 16A is a graph representing the spherical aberration of the lens assembly 900 according to still another one of various embodiments, FIG. 16B is a graph representing the astigmatism of the lens assembly 900 according to still another one of various embodiments, and FIG. 16C is a graph illustrating the distortion rate of the lens assembly 900 according to still another one of various embodiments. Collectively, FIGS. 7-8C illustrate Example 6 of the instant disclosure.

Referring to FIG. 15 and FIGS. 16A to 16C, the lens assembly 900 may include first to fifth lenses 901, 902, 903, 904, and 905 and a band-pass filter 907, and the first to fifth lenses 901, 902, 903, 904, and 905 may be sequentially arranged along the optical axis A from the subject O side towards the image sensor 906 side. Although there are some differences in details, such as shapes, lens data, or the like of the first to fifth lenses 901, 902, 903, 904, and 905, the lens assembly 900 may satisfy at least one of the conditions described through the preceding embodiments.

According to an embodiment, compared with the lens assembly 400 in FIG. 5, in the lens assembly 900, the materials of the second lens 902, the third lens 903, and the fourth lens 904 are changed, and thus it is possible to implement a structure in which the ratio of T58/ImgH is relatively large.

The lens data of the lens assembly 900 are represented in Table 11 below, in which "S2 (aperture stop)" refers to an aperture surface of the diaphragm S, "obj" refers to a subject, and "img" refers to an image sensor. "S1 to S13" refer to the surfaces of the lenses 901, 902, 903, 904, and 905 and/or the band-pass filter 907. The lens assembly 900 may include, for example, an image sensor 906 of ¼ inches, may have an F-number of 2.085, a half angle of view of 36.53 degrees, and an effective focal length (EFL) of 2.618, and may satisfy at least one of the equations set forth above.

TABLE 11

| Surface | Surface Type | Curvature Radius (Y-Radius) | Thickness or Air Gap | Refractive Index | Abbe Number | Aperture Surface of Diaphragm (H-Aperture) | Effective Focal Length (EFL) |
|---|---|---|---|---|---|---|---|
| obj | Sphere | inf | 400 | | | | |
| S1 | Asphere | 0.950431 | 0.432381 | 1.544100 | 0.6 | 0.64 | 1.902 |
| S2(stop) | Asphere | 9.316049 | 0.042899 | | | 0.591627 | |
| S3 | Asphere | 117.2278 | 0.22 | 1.755201 | 0.3 | 0.576714 | −4.4892 |
| S4 | Asphere | 3.319687 | 0.206835 | | | 0.516 | |
| S5 | Asphere | −6.34446 | 0.359288 | 1.615521 | 0.4 | 0.568087 | −195.968 |
| S6 | Asphere | −6.83933 | 0.358288 | | | 0.762314 | |
| S7 | Asphere | −2.33087 | 0.309674 | 1.753294 | 0.3 | 1.00348 | −5.103 |
| S8 | Asphere | −6.18039 | 0.025 | | | 1.215825 | |
| S9 | Asphere | 0.820811 | 0.498502 | 1.544100 | 0.6 | 1.5 | 4.9804 |
| S10 | Asphere | 0.923 | 0.121866 | | | 1.772343 | |
| S11 | Sphere | inf | 0.11 | 1.516800 | 0.6 | 1.93292 | |
| S12 | Sphere | inf | 0.061046 | | | 1.971426 | |

TABLE 11-continued

| Surface | Surface Type | Curvature Radius (Y-Radius) | Thickness or Air Gap | Refractive Index | Abbe Number | Aperture Surface of Diaphragm (H-Aperture) | Effective Focal Length (EFL) |
|---|---|---|---|---|---|---|---|
| S13 | Sphere | inf | 0.469791 | | | 2.008579 | |
| img | Sphere | inf | 3.00E−02 | | | 2.4 | |

The aspherical coefficients of the first to fifth lenses 901, 902, 903, 904, and 905 are represented in Table 12 below.

TABLE 12

| Parameter | S1 | S2(stop) | S3 | S4 | S5 |
|---|---|---|---|---|---|
| Y radius | 0.950431 | 9.316049 | 117.2278 | 3.319687 | −6.34446 |
| K | −4.86247 | 49.50064 | −585289 | 18.22503 | 17.19337 |
| A | 0.485028 | −0.57602 | −0.15408 | 0.414729 | −0.38738 |
| B | 5.646218 | 10.10576 | 4.098922 | −11.4633 | 2.582416 |
| C | −111.338 | −208.048 | −79.6169 | 254.7646 | −77.1102 |
| D | 1069.479 | 2433.065 | 1022.362 | −3094.53 | 994.1714 |
| E | −6128.42 | −16814.5 | −7527.53 | 22953.39 | −7457.13 |
| F | 21523.29 | 70344.54 | 32944.98 | −104656 | 33812.05 |
| G | −45408.1 | −175164 | −84675.2 | 284698 | −90713 |
| H | 52730.47 | 268862.2 | 117950.7 | −420340 | 131065 |
| J | −25881.7 | −137308 | −68600.3 | 256956 | −77134.7 |

| Parameter | S6 | S7 | S8 | S9 | S10 |
|---|---|---|---|---|---|
| Y radius | −6.83933 | −2.33087 | −6.18039 | 0.820811 | 0.923 |
| K | 71.70312 | −97.2863 | 13.67987 | −9.5599 | −5.26429 |
| A | 0.033245 | 0.845947 | 0.426962 | −0.11942 | −0.52502 |
| B | −1.24881 | −3.25145 | −0.69946 | −1.6026 | 0.800959 |
| C | 1.763061 | 5.474949 | −3.28679 | 4.332159 | −1.05739 |
| D | −5.75082 | −4.99169 | 14.90137 | −5.9101 | 1.115512 |
| E | 60.97328 | −1.63673 | −28.9955 | 5.051221 | −0.80353 |
| F | −266.615 | 9.177702 | 31.81058 | −2.77112 | 0.365999 |
| G | 563.6107 | −10.6179 | −20.1418 | 0.940745 | −0.10046 |
| H | −591.189 | 6.853447 | 6.871702 | −0.17907 | 0.015158 |
| J | 251.7305 | −2.03728 | −0.98034 | 0.014571 | −9.65E−04 |

Referring again to FIGS. 1 to 4, a camera module or an electronic device (e.g., the camera module 280 in FIG. 2 or the electronic device 101 in FIG. 3) including the above-described lens assembly 400, 500, 600, 700, 800, or 900 will be described.

According to certain embodiments, the lens assembly 400, 500, 600, 700, 800, or 900 described above may be provided as the lens assembly 210 of FIG. 2. In an embodiment, a camera module (e.g., the camera module 280 in FIG. 2) including such a lens assembly 400, 500, 600, 700, 800, or 900 may be implemented as the camera module 305, 312, or 313 in FIG. 3 or FIG. 4. In some embodiments, the camera module 305 disposed on the front side of the electronic device 101 of FIG. 3 may include a plurality of cameras, for example, a first camera and a second camera. In an embodiment, the first camera of the camera module 305 may include the lens assembly 400, 500, 600, 700, 800, or 900 as described above, and may detect distance information on a subject using near-infrared rays. The second camera of the camera module 305 may be a visible-light camera for capturing color or black and white images. For example, the second camera may detect or acquire second information on a subject, for example, at least one of color information, brightness information, chroma information, and contrast information. In some embodiments, the second camera may include a plurality of cameras. In a particular example, the first camera may be a near-infrared camera, and the second camera may be constituted with a combination of a telephoto camera and a wide-angle camera.

According to certain embodiments, a camera module (e.g., the camera module 280 in FIG. 2) including the lens assembly 400, 500, 600, 700, 800, or 900 may be used for security purposes in, for example, public spaces or living spaces. For example, the lens assembly 400, 500, 600, 700, 800, or 900 or the camera module 280 may be utilized as a closed circuit camera for security, a camera for recognizing an object in a vehicle, or be used as part of a thermal imaging camera. In another embodiment, the lens assembly 400, 500, 600, 700, 800, or 900 may be manufactured to have a total length of about 3 mm. For example, the lens assembly 400, 500, 600, 700, 800, or 900 may be mounted in a personal electronic device such as a mobile communication terminal to provide functions such as user authentication, object recognition, augmented reality, and 3D scanner function.

According to certain embodiments, the electronic device 101 emits light (e.g., infrared rays or near-infrared rays) towards a subject using a light source device, and the first camera of the camera module 305 may detect first information on a subject such as distance information (e.g., depth information) by detecting light emitted from the light source device and reflected by the subject. In an embodiment, the light source device may include an infrared-emitting diode or a near-infrared laser light source, and the light-emitting element 306 of the electronic device 101 may be utilized as the light source device described above. In another embodiment, the electronic device 101 may include a light source device separate from the light-emitting element 306 to emit light for detecting distance information.

According to an embodiment, a lens assembly (e.g., the lens assembly 400, 500, 600, 700, 800, or 900 in FIG. 5, FIG. 7, FIG. 9, FIG. 11, FIG. 13, or FIG. 15) may include: a first lens (e.g., the first lens 401, 501, 601, 701, 801, or 901 in FIG. 5, FIG. 7, FIG. 9, FIG. 11, FIG. 13, or FIG. 15) having positive refractive power and including a subject side surface being convex; a second lens (e.g., the second lens 402, 502, 602, 702, 802, or 902 in FIG. 5, FIG. 7, FIG. 9, FIG. 11, FIG. 13, or FIG. 15) having positive or negative refractive power; a third lens (e.g., the third lens 403, 503, 603, 703, 803, or 903 in FIG. 5, FIG. 7, FIG. 9, FIG. 11, FIG. 13, or FIG. 15) having negative refractive power and including an image sensor side surface being convex in a center portion thereof, through which an optical axis passes; a fourth lens (e.g., the fourth lens 404, 504, 604, 704, 804, or 904 in FIG. 5, FIG. 7, FIG. 9, FIG. 11, FIG. 13, or FIG. 15) having positive or negative refractive power; and a fifth lens (e.g., the fifth lens 405, 505, 605, 705, 805, or 905 in FIG. 5, FIG. 7, FIG. 9, FIG. 11, FIG. 13, or FIG. 15) having positive or negative refractive power. The first lens, the second lens, the third lens, the fourth lens, and the fifth lens may be sequentially arranged from a subject to an image sensor along the optical axis (e.g., the optical axis A in FIG. 5, FIG. 7, FIG. 9, FIG. 11, FIG. 13, or FIG. 15). The lens assembly may satisfy Conditional Expression 1 as follows.

$$0.6 < TTL/ImgH < 1 \qquad \text{Conditional Expression 1}$$

Here, "TTL" represents a distance from the subject side surface of the first lens to an imaging surface of the image sensor, and "ImgH" represents a maximum image height of an image formed on the imaging surface.

According to an embodiment, the lens assembly may satisfy Conditional Expression 2 as follows.

$$0.25 < BFL/TTL < 0.6 \qquad \text{Conditional Expression 2}$$

Here, "BFL" represents a distance from a center of an image sensor side surface of the fifth lens to the imaging surface of the image sensor.

According to an embodiment, the lens assembly may satisfy Conditional Expression 3 as follows.

$$-120 < f3/f < -6 \qquad \text{Conditional Expression 3}$$

Here, "f3" represents a focal length of the third lens, and "f" represents a total focal length of the lens assembly.

According to an embodiment, the lens assembly may satisfy Conditional Expression 4 as follows.

$$0.3 < T17/TTL < 0.6 \qquad \text{Conditional Expression 4}$$

(Here, "T17" represents a distance from the subject side surface of the first lens to a subject side surface of the fourth lens.

According to an embodiment, the lens assembly may satisfy Conditional Expression 5 as follows.

$$1.5 < T57/T67 < 2.5 \qquad \text{Conditional Expression 5}$$

Here, "T57" represents a distance from a subject side surface of the third lens to a subject side surface of the fourth lens, and "T67" represents a distance from the image sensor side surface of the third lens to the subject side surface of the fourth lens.

According to an embodiment, the lens assembly may satisfy Conditional Expression 6 as follows.

$$0.6 < R5/R6 < 1 \qquad \text{Conditional Expression 6}$$

Here, "R5" represents a curvature of a subject side surface of the third lens, and "R6" represents a curvature of the image sensor side surface of the third lens.

According to an embodiment, the lens assembly may have a relationship that may satisfy Conditional Expression 7 as follows.

$$1.45 < (V2+V4)/V3 < 2.1 \qquad \text{Conditional Expression 7}$$

Here, "V2" represents the Abbe number of the second lens, "V3" represents the Abbe number of the third lens, and "V4" represents the Abbe number of the fourth lens. According to an embodiment, the lens assembly may satisfy Conditional Expression 1 as follows.

$$0.15 < T58/ImgH < 0.25 \qquad \text{Conditional Expression 8}$$

Here, "T58" represents a distance from a subject side surface of the third lens to an image sensor side surface of the fourth lens.

According to an embodiment, the lens assembly may satisfy Conditional Expression 9 as follows.

$$-35 < R2-R3/R2+R3 < -0.2 \qquad \text{Conditional Expression 9}$$

Here, "R2" represents a curvature of an image sensor side surface of the first lens, and "R3" represents a curvature of a subject side surface of the second lens.

According to an embodiment, the image sensor may have a size ranging from 1/10.1 inches to 1/3.1 inches.

According to an embodiment, at least one of the first lens, the second lens, the third lens, the fourth lens, and the fifth lens may be a meniscus lens.

According to an embodiment, the lens assembly may further include a band-pass filter (e.g., the band-pass filter 407, 507, 607, 707, 807, or 907 in FIG. 5, FIG. 7, FIG. 9, FIG. 11, FIG. 13, or FIG. 15) disposed between the fifth lens and the image sensor, and the band-pass filter may have a transmittance of at least 95% for light having a wavelength of 350 nm to 850 nm. According to an embodiment, an electronic device may include at least one camera including a lens assembly, and may be configured to acquire information on a subject from light incident through the lens assembly; and a processor or an image signal processor configured to detect distance information of the subject based on the information. The lens assembly may include at least a first lens, a second lens, a third lens, a fourth lens, and a fifth lens sequentially arranged along an optical axis from the subject to an image sensor, the third lens may have negative refractive power, and the image sensor may have a size between 1/10.1 inches and 1/3.1 inches. The lens assembly may satisfy Conditional Expression 10 as follows.

$$0.6 < TTL/ImgH < 1 \qquad \text{Conditional Expression 10}$$

Here, "TTL" represents a distance from the subject side surface of the first lens to an imaging surface of the image sensor, and "ImgH" represents a maximum image height of an image formed on the imaging surface.

According to an embodiment, the lens assembly may satisfy Conditional Expression 11 as follows.

$$0.25 < BFL/TTL < 0.6 \qquad \text{Conditional Expression 11}$$

Here, "BFL" represents a distance from a center of an image sensor side surface of the fifth lens to the imaging surface of the image sensor.

According to an embodiment, the lens assembly may satisfy Conditional Expression 12 as follows.

$$-120 < f3/f < -6 \qquad \text{Conditional Expression 12}$$

Here, "f3" represents a focal length of the third lens, and "f" represents a total focal length of the lens assembly.

According to an embodiment, the image sensor side surface of the third lens may be convex at least in a center portion thereof, through which the optical axis passes, and the subject side surface of the third lens may be concave.

According to an embodiment, the lens assembly may satisfy Conditional Expression 13 as follows.

$$1.5 < T57/T67 < 2.5 \qquad \text{Conditional Expression 13}$$

Here, "T57" represents a distance from the subject side surface of the third lens to a subject side surface of the fourth lens, and "T67" represents a distance from the image sensor side surface of the third lens to the subject side surface of the fourth lens.

According to an embodiment, a lens assembly may include: a first lens having positive refractive power and including a subject side surface being convex; a second lens having negative refractive power; a third lens having negative refractive power and including an image sensor side surface being convex in a center portion thereof, through which an optical axis passes; a fourth lens having negative refractive power; and a fifth lens having positive refractive power. The first lens, the second lens, the third lens, the fourth lens, and the fifth lens may be sequentially arranged from the subject to an image sensor along the optical axis. The lens assembly may satisfy Conditional Expression 15 as follows.

$$0.6 < TTL/ImgH < 1 \qquad \text{Conditional Expression 14}$$

Here, "TTL" represents a distance from the subject side surface of the first lens to an imaging surface of the image sensor, and "ImgH" represents a maximum image height of an image formed on the imaging surface.

$$0.25 < BFL/TTL < 0.6 \qquad \text{Conditional Expression 15}$$

Here, "BFL" represents a distance from a center of an image sensor side surface of the fifth lens to the imaging surface of the image sensor.

According to an embodiment, the lens assembly may satisfy Conditional Expression 16 as follows.

$$0.6 < R5/R6 < 1 \qquad \text{Conditional Expression 16}$$

Here, "R5" represents a curvature of a subject side surface of the third lens, and "R6" represents a curvature of the image sensor side surface of the third lens.

According to an embodiment, the lens assembly may satisfy Conditional Expression 17 as follows.

$$1.45 < (V2+V4)/V3 < 2.1 \qquad \text{Conditional Expression 17}$$

Here, "V2" represents the Abbe number of the second lens, "V3" represents the Abbe number of the third lens, and "V4" represents the Abbe number of the fourth lens.

While the disclosure has been shown and described with reference to certain embodiments thereof, it will be understood by those skilled in the art that various changes in form and details may be made therein without departing from the spirit and scope of the disclosure as defined by the appended claims.

What is claimed is:

1. A lens assembly comprising:
 a first lens having positive refractive power and including a subject side surface being convex;
 a second lens having positive or negative refractive power;
 a third lens having negative refractive power and including a subject side surface being convex toward an image sensor side in a center portion thereof, through which an optical axis passes;
 a fourth lens having positive or negative refractive power; and
 a fifth lens having positive or negative refractive power,
 wherein the first lens, the second lens, the third lens, the fourth lens, and the fifth lens are sequentially arranged from a subject to an image sensor along the optical axis,
 wherein the lens assembly satisfies a condition defined by $$0.6 < TTL/ImhH < 1,$$

wherein "TTL" represents a distance from the subject side surface of the first lens to an imaging surface of the image sensor, and "ImgH" represents a maximum image height of an image formed on the imaging surface, and a condition defined by $$0.6 < R5/R6 < 1,$$

wherein "R5" represents a curvature of the subject side surface of the third lens, and "R6" represents a curvature of an image sensor side surface of the third lens.

2. The lens assembly of claim 1, wherein the lens assembly satisfies a condition defined by $$0.25 < BFL/TTL < 0.6, \text{and}$$

wherein "BFL" represents a distance from a center of an image sensor side surface of the fifth lens to the imaging surface of the image sensor.

3. The lens assembly of claim 1, wherein the lens assembly satisfies a condition defined by $$-120 < f3/f < -6, \text{ and}$$

wherein "f3" represents a focal length of the third lens, and "f" represents a total focal length of the lens assembly.

4. The lens assembly of claim 1, wherein the lens assembly satisfies a condition defined by $$0.3 < T17/TTL < 0.6, \text{ and}$$

wherein "T17" represents a distance from the subject side surface of the first lens to a subject side surface of the fourth lens.

5. The lens assembly of claim 1, wherein the lens assembly satisfies a condition defined by $$1.5 < T57/T67 < 2.5, \text{ and}$$

wherein "T57" represents a distance from the subject side surface of the third lens to a subject side surface of the fourth lens, and "T67" represents a distance from the image sensor side surface of the third lens to the subject side surface of the fourth lens.

6. The lens assembly of claim 1, wherein the lens assembly satisfies a condition defined by $$1.45 < (V2+V4)/V3 < 2.1, \text{ and}$$

wherein "V2" represents an Abbe number of the second lens, "V3" represents an Abbe number of the third lens, and "V4" represents an Abbe number of the fourth lens.

7. The lens assembly of claim 1, wherein the lens assembly satisfies a condition defined by $$0.15 < T58/ImgH < 0.25, \text{ and}$$

wherein "T58" represents a distance from the subject side surface of the third lens to an image sensor side surface of the fourth lens.

8. The lens assembly of claim 1, wherein the lens assembly satisfies a condition defined by $$-35 < (R2-R3)/(R2+R3) < -0.2, \text{ and}$$

wherein "R2" represents a curvature of an image sensor side surface of the first lens, and "R3" represents a curvature of a subject side surface of the second lens.

9. The lens assembly of claim 1, wherein the image sensor has a size ranging from 1/10.1 inches to 1/3.1 inches.

10. The lens assembly of claim 1, wherein at least one of the first lens, the second lens, the third lens, the fourth lens, and the fifth lens is a meniscus lens.

11. The lens assembly of claim 1, further comprising:
a band-pass filter disposed between the fifth lens and the image sensor,
wherein the band-pass filter has a transmittance of at least 95% for light having a wavelength between 350 nm and 850 nm.

12. An electronic device comprising:
at least one camera including a lens assembly, and configured to acquire information on a subject from light incident through the lens assembly; and
a processor or an image signal processor configured to detect distance information of the subject based on the information,
wherein:
the lens assembly includes at least a first lens, a second lens, a third lens, a fourth lens, and a fifth lens sequentially arranged along an optical axis from the subject to an image sensor,
the third lens has negative refractive power,
the image sensor has a size between 1/10.1 inches and 1/3.1 inches,
the lens assembly satisfies a condition defined by $0.6 < TTL/ImgH < 1$, wherein "TTL" represents a distance from a subject side surface of the first lens to an imaging surface of the image sensor, and "ImgH" represents a maximum image height of an image formed on the imaging surface, and a condition defined by $0.6 < R5/R6 < 1$, wherein "R5" represents a curvature of a subject side surface of the third lens, and "R6" represents a curvature of an image sensor side surface of the third lens.

13. The electronic device of claim 12, wherein the lens assembly satisfies a condition defined by $0.25 < BFL/TTL < 0.6$, and wherein "BFL" represents a distance from a center of an image sensor side surface of the fifth lens to the imaging surface of the image sensor.

14. The electronic device of claim 12, wherein the lens assembly satisfies a condition defined by $-120 \leq f3/f \leq -6$, and wherein "f3" represents a focal length of the third lens, and "f" represents a total focal length of the lens assembly.

15. The electronic device of claim 12, wherein the image sensor side surface of the third lens is convex at least in a center portion thereof, through which the optical axis passes, and the subject side surface of the third lens is concave.

16. The electronic device of claim 15, wherein the lens assembly satisfies a condition defined by $1.5 < T57/T67 < 2.5$, wherein "T57" represents a distance from the subject side surface of the third lens to a subject side surface of the fourth lens, and "T67" represents a distance from the image sensor side surface of the third lens to the subject side surface of the fourth lens.

17. A lens assembly comprising:
a first lens having positive refractive power and including a subject side surface being convex;
a second lens having negative refractive power;
a third lens having negative refractive power and including a subject side surface being convex toward an image sensor side in a center portion thereof, through which an optical axis passes;
a fourth lens having negative refractive power; and
a fifth lens having positive refractive power,
wherein:
the first lens, the second lens, the third lens, the fourth lens, and the fifth lens are sequentially arranged from a subject to an image sensor along the optical axis;
the lens assembly satisfies a condition defined by $0.6 < TTL/ImgH < 1$, "TTL" represents a distance from the subject side surface of the first lens to an imaging surface of the image sensor, and "ImgH" represents a maximum image height of the image formed on the imaging surface; and
the lens assembly satisfies a condition defined by $0.25 < BFL/TTL < 0.6$, and "BFL" represents a distance from a center of an image sensor side surface of the fifth lens to the imaging surface of the image sensor.

18. The lens assembly of claim 17, wherein the lens assembly satisfies a condition defined by $0.6 < R5/R6 < 1$, and wherein "R5" represents a curvature of the subject side surface of the third lens, and "R6" represents a curvature of an image sensor side surface of the third lens.

19. The lens assembly of claim 17, wherein the lens assembly satisfies a condition defined by $1.45 < (V2+V4)/V3 < 2.1$, and wherein "V2" represents an Abbe number of the second lens, "V3" represents an Abbe number of the third lens, and "V4" represents an Abbe number of the fourth lens.

* * * * *